US012110405B2

(12) United States Patent
Miyakoshi et al.

(10) Patent No.: US 12,110,405 B2
(45) Date of Patent: Oct. 8, 2024

(54) AQUEOUS DISPERSION, METHOD OF MANUFACTURING AQUEOUS DISPERSION, AND INK

(71) Applicants: Ryo Miyakoshi, Kanagawa (JP); Takuya Yamazaki, Kanagawa (JP); Chikako Hatta, Kanagawa (JP)

(72) Inventors: Ryo Miyakoshi, Kanagawa (JP); Takuya Yamazaki, Kanagawa (JP); Chikako Hatta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 490 days.

(21) Appl. No.: 17/476,724

(22) Filed: Sep. 16, 2021

(65) Prior Publication Data

US 2022/0106491 A1   Apr. 7, 2022

(30) Foreign Application Priority Data

Oct. 1, 2020 (JP) .................... 2020-167249

(51) Int. Cl.
| | |
|---|---|
| *C09D 11/326* | (2014.01) |
| *C08L 67/00* | (2006.01) |
| *B82Y 30/00* | (2011.01) |
| *B82Y 40/00* | (2011.01) |

(52) U.S. Cl.
CPC ............ *C09D 11/326* (2013.01); *C08L 67/00* (2013.01); *B82Y 30/00* (2013.01); *B82Y 40/00* (2013.01)

(58) Field of Classification Search
CPC ......... B82Y 30/00; B82Y 40/00; C08L 67/00; C09D 11/104; C09D 11/324; C09D 11/326; C08K 3/04
See application file for complete search history.

(56) References Cited

U.S. PATENT DOCUMENTS

| | | | |
|---|---|---|---|
| 2007/0157848 A1* | 7/2007 | Miyabayashi | .......... C09B 68/24 106/31.13 |
| 2017/0355868 A1 | 12/2017 | Saiga et al. | |
| 2019/0264050 A1 | 8/2019 | Harada et al. | |
| 2019/0276694 A1 | 9/2019 | Yamazaki et al. | |
| 2020/0002558 A1 | 1/2020 | Iwasaki et al. | |
| 2020/0263049 A1 | 8/2020 | Harada et al. | |
| 2020/0277505 A1 | 9/2020 | Yamazaki et al. | |

(Continued)

FOREIGN PATENT DOCUMENTS

| | | |
|---|---|---|
| JP | 2002-256181 | 9/2002 |
| JP | 2002-322396 | 11/2002 |

(Continued)

OTHER PUBLICATIONS

U.S. Office Action dated Apr. 14, 2023, in U.S. Appl. No. 17/534,601, 14 pages.
U.S. Appl. No. 17/534,601, filed Nov. 24, 2021, Miyakoshi et al.

*Primary Examiner* — Anh T Vo
(74) *Attorney, Agent, or Firm* — Grüneberg and Myers PLLC

(57) ABSTRACT

An aqueous dispersion contains emulsion resin particles that contains pigment enclosing emulsion resin particles enclosing an inorganic pigment, wherein the pigment enclosing emulsion resin particles have a 50 percent cumulative volume particle diameter (D50) of from 40 to 300 nm as measured by laser diffraction scattering method, wherein the pigment enclosing emulsion resin particles have an average aspect ratio of from 1.0 to 1.5.

9 Claims, 8 Drawing Sheets

(56) References Cited

U.S. PATENT DOCUMENTS

2020/0307246 A1  10/2020  Hatta et al.
2021/0009824 A1   1/2021  Miyakoshi et al.
2022/0169872 A1*  6/2022  Miyakoshi ........... C09D 11/326

FOREIGN PATENT DOCUMENTS

| JP | 2005-120136 | 5/2005 |
| JP | 2016-196621 | 11/2016 |
| JP | 2019-099819 | 6/2019 |

* cited by examiner

AQUEOUS DISPERSION, METHOD OF MANUFACTURING AQUEOUS DISPERSION, AND INK

CROSS-REFERENCE TO RELATED APPLICATIONS

This patent application is based on and claims priority pursuant to 35 U.S.C. § 119 to Japanese Patent Application No. 2020-167249, filed on Oct. 1, 2020, in the Japan Patent Office, the entire disclosure of which is hereby incorporated by reference herein.

BACKGROUND

Technical Field

The present disclosure is related to an aqueous dispersion, a method of manufacturing an aqueous dispersion, and an ink.

Description of the Related Art

Since inkjet printing devices are relatively quiet, have low running costs, and are capable of printing color images with ease, they are now widely used at home to output digital information. Inkjet technologies have been appealing in commercial and industrial as well as home settings. In commercial and industrial applications, there is demand for the image quality equivalent to that of typical offset printing for printing on recording media such as coated paper having low ink absorbing property and non-ink-absorbing plastic media by an inkjet printing method.

SUMMARY

According to embodiments of the present disclosure, an aqueous dispersion is provided which contains emulsion resin particles that contains pigment enclosing emulsion resin particles enclosing an inorganic pigment, wherein the pigment enclosing emulsion resin particles have a 50 percent cumulative volume particle diameter (D50) of from 40 to 300 nm as measured by laser diffraction scattering method, wherein the pigment enclosing emulsion resin particles have an average aspect ratio of from 1.0 to 1.5.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1B:
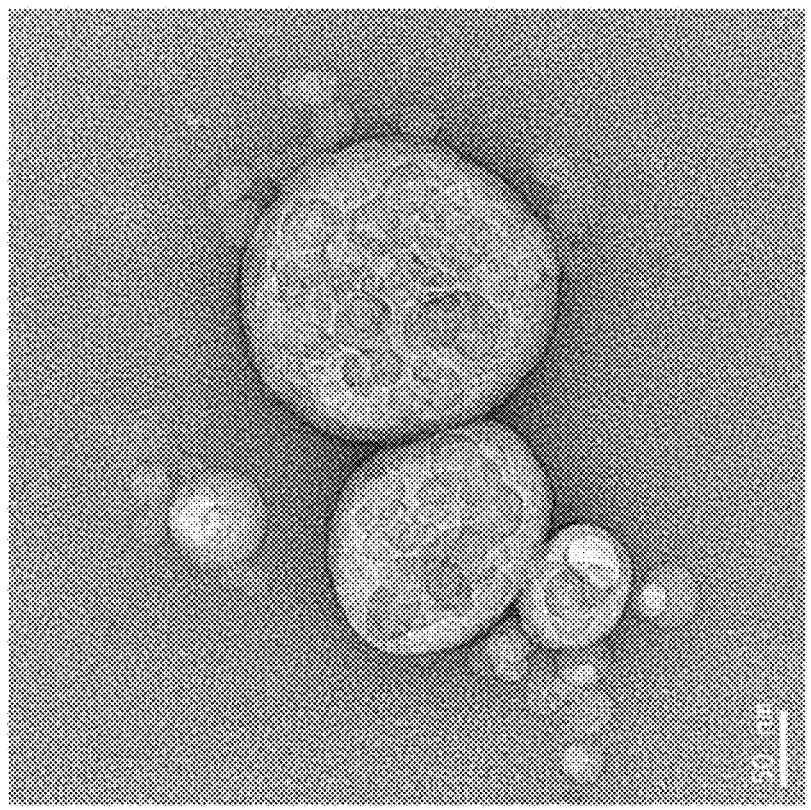
FIGS. 1A and 1B are transmission electron microscope (TEM) images illustrating an aqueous dispersion containing pigment enclosing resin particles produced in Example 1, which is described later.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an aqueous dispersion containing pigment-resin composite particles is provided with which images having excellent optical density can be produced.

An embodiment of the present disclosure is a description for illustration purpose only and the present disclosure is not limited thereto.

Pigment Enclosing Emulsion Resin Particles

The pigment enclosing emulsion resin particles in the present disclosure has a form of a resin emulsion. Inclusion of a pigment in the resin emulsion can minimize detachment of the resin into a medium. Emulsion means a state in which particles are dispersed in water and ink. The particles can be solid or liquid.

The pigment enclosing emulsion resin particles (hereinafter also referred to as pigment enclosing resin particles) means a form in which pigments are enclosed in emulsion particles of resin emulsion. It is preferable that the pigment enclosing emulsion resin particles be free of a form in which pigments are not enclosed in emulsion pigments but dispersed in a dispersion medium or pigments partially exposed to the surface of the emulsion resin particles. The pigment enclosing resin particles are preferably spherical. The pigment enclosing emulsion resin particles in the present specification mean that pigments are enclosed in a resin emulsion. For examples, coated pigments and microcapsulated pigments have been proposed in Japanese unexamined published application Nos 2016-196621, 2002-322396, 2019-099819, and 2005-120136. However, these are not forms having pigments enclosed in a resin emulsion or pigment enclosing emulsion resin particles.

Resin particles having no pigments are manufactured other than the pigment enclosing resin particles when the pigment enclosing resin particles are manufactured. The proportion of the pigment enclosing resin particles can be adjusted by suitably selecting the ratio of the pigment enclosing resin particles to emulsion resin particles having no pigment to suit to a particular application. The proportion of the pigment enclosing resin particles is obtained by: acquiring five or more images, each having three or more particles having a size of 50 nm or greater while arbitrarily changing the field of vision; and calculating the ratio of the number of the pigment enclosing resin particles to the particles having a size of 50 nm or greater. It is preferably 30 percent or higher and more preferably 50 percent or higher on average. The pigment enclosing resin particles preferably contains two or more primary particles of pigments. An increase in the pigment density in a particle improves the optical density. The pigment enclosing resin particles can be observed with an instrument such as a transmission electron microscope (TEM).

One way of observing pigment enclosing resin particles with a TEM is as follows: An aqueous dispersion containing pigment enclosing resin particles is diluted with deionized water to obtain a sample liquid having a solid content concentration of 0.1 percent; next, 1 μl of the sample liquid is placed on a hydrophilized collodion film attached mesh (Cu 150 mesh, manufactured by NISSIN EM CO., LTD.) using a micro pipette; immediately thereafter, it is absorbed by triangle-shaped filter paper; next, 1 μl of Em stainer diluted with a factor of 10 is placed on the mesh; and immediately thereafter, it is absorbed by triangle-shaped filter paper. Subsequent to drying under a reduced pressure, the sample remaining on the mesh is observed with a TEM (JEM-2100F, manufactured by JEOL Ltd.) at an acceleration voltage of 200 kV and 40,000× magnification.

An enclosed pigment is spherical emulsion where the entire surface of the pigment is coated with resin. It is preferable that unenclosed pigments and/or pigments partially exposed to the surface of emulsion resin particles be not present in the dispersion medium in an aqueous dispersion. Whether or not a pigment is enclosed can be observed with an instrument such as the TEM mentioned above.

The aspect ratio of pigment enclosing resin particles is obtained by image processing of images of particles obtained by observing the pigment enclosing resin particles using the TEM mentioned above. In fact, while changing observation points, multiple images including pigment enclosing resin particles are obtained in different fields of vision. Pigment enclosing resin particles without overlapping other particles are extracted by digitization using image analysis software (ImageJ, created by National Institutes of Health) followed by particle analysis. The ratio of the major axis to the minor axis of the ellipse most approximate to a particle is determined as the aspect ratio. The aspect ratios of 20 particles are used to calculate the average thereof.

The degree of the enclosure of pigments is evaluated by quantifying pigments not enclosed but exposed, which is the pigment exposure ratio. The pigment exposure ratio is calculated by using an SEM. One way of calculating the pigment exposure ratio is as follows: An aqueous dispersion containing pigment enclosing emulsion resin particles having a solid content concentration of 10.75 percent by mass is prepared using deionized water; this aqueous dispersion is applied to coated paper (LumiArt Gloss 130) with a 0.15 mm bar coater followed by drying at 25 degrees C.

This dried coating film is cut out and fixed onto a stub for SEM observation with carbon tape. This fixed film is observed with an SEM (Merlin, manufactured by ZEISS) equipped with a reflected electron detector at an acceleration voltage of 0.75 kV and 2,000 to 20,000× magnification) without electroconductivity treatment. In this observation, exposed pigments are identified due to the contrast between carbon black and the resin in the SEM image attributable to the difference in the emission amount of reflected electron. The proportion (pigment exposure ratio) of the area of pigments in the entire surface of the film at 20.000× magnification is preferably 8 percent or less and more preferably 5 percent or less.

The area of pigments in the entire surface of the film is obtained from a digitized SEM image. It is preferable to average three or more areas obtained by arbitrarily changing the observation points. The pigment exposure ratio tends to be low when pigments are not possibly observed due to charge up under these observation conditions. In fact, charge up is likely to occur when the ratio is 3 percent or less.

When two or more primary pigment particles are covered with resin, the pigments are homogeneously dispersed in coated film after the film is heated and dried. Such a dried film has a low surface roughness. This low roughness enhances the optical density of an image. The surface roughness of coated film is preferably 20 nm or less, more preferably 10 nm or less, and particularly preferably 5 nm or less. A surface roughness of 20 nm or less minimizes a decrease in optical density after drying by heating.

The surface roughness of the coated film mentioned above or a printed image is calculated using a scanning probe microscope (SPM). One way of obtaining coated film is to: prepare an aqueous dispersion containing pigment enclosing resin particles having a solid content concentration of 10.75 percent by mass using deionized water; apply the dispersion onto coated paper (LumiArt Gloss 130) with 0.15 mm bar coater; and dry and heat the coated paper in an oven at 100 degrees C. for five minutes. This coated film is cut out followed by observation under the following conditions to calculate the surface roughness. Three fields of vision in the coated film are observed by arbitrarily changing the observation points. The thus-obtained values are averaged to obtain the surface roughness.

Instrument: SPM (DimensionIcon, manufactured by Bruker)
Cantilever: OMCL-AC240TS, manufactured by Olympus Corporation
Measurement mode: tapping mode
Observation range: 2 μm square The 50 percent cumulative volume particle diameter (D50) of the pigment enclosing resin particles is preferably from 40 to 300 nm, more preferably from 60 to 200 nm, and furthermore preferably from 70 to 150 nm. A particle diameter of 40 nm or greater reduces liquid viscosity, thereby enhancing dispersion stability. It also enhances the optical density by enclosing multiple primary pigment particles. A particle diameter of 300 nm or less minimizes particle sedimentation and enhances storage stability as particles. There is no particular limit to a device for evaluating the particle diameter of pigment enclosing resin particles. It is preferable to measure 50 percent cumulative volume particle diameter (D50) using a laser diffraction/scattering particle size distribution measuring device (LA-960, manufactured by HORIBA, Ltd.).

Method of Manufacturing Pigment Enclosing Resin Particles

The method of manufacturing the pigment enclosing resin particles of the present disclosure is to manufacture an emulsion of pigment enclosing resin particles in which pigments are enclosed with resin. It is not particularly limited. One way of manufacturing the pigment enclosing resin particles of the present disclosure has the following steps 1 to 4.

Step 1: pigment, pigment dispersant, and an organic solvent are mixed to obtain pigment pre-dispersion having a 50 percent cumulative volume particle diameter (D50) of pigments of from 10 to 150 nm.

Step 2: the pigment pre-dispersion obtained in the step 1 is mixed with resin to obtain a resin solution of pigment dispersion (pigment-dispersed resin solution).

Step 3: the pigment-dispersed resin solution obtained in the step 2 is mixed with water to obtain liquid dispersion pigment enclosing emulsion resin particles in which the pigment is enclosed in the resin.

Step 4: the liquid dispersion containing pigment enclosing emulsion resin particles obtained in the step 3 is purged of the organic solvent to obtain the aqueous dispersion containing the pigment enclosing emulsion resin particles. Each of the steps 1 to 4 is described in detail below.

Step 1

The pigment pre-dispersion obtained in the step 1 is obtained by dispersing a pigment in an organic solvent, optionally with a pigment dispersant and other components followed by adjusting the particle diameter thereof. There is no particular limit to the device used in the step 1. It is preferable to use a disperser.

The organic solvent used for preparation of the pigment pre-dispersion is not particularly limited as long as it can dissolve the resin in the step 2. Specific examples include, but are not limited to, ketones such as methylethyl ketone and acetone.

The particle diameter (size) of the pigment in the pigment pre-dispersion is not particularly limited. The pigment pre-dispersion preferably has a 50 percent cumulative volume particle diameter (D50) of from 10 to 150 nm and more preferably from 20 to 120 nm to reduce the particle diameter of the pigment enclosing resin particles.

The particle diameter of a pigment can be measured by a zeta-potential particle size measuring system (ELSZ-1000, manufactured by OTSUKA ELECTRONICS Co., LTD.).

The content of the pigment in the pigment pre-dispersion is not particularly limited and can be suitably selected to suit to a particular application. The ratio of the pigment to the pigment dispersant in the pigment pre-dispersion is not particularly limited. The ratio is preferably from 4 to 0.2 to 4 to 4 and more preferably from 4 to 0.5 to 4 to 3 to enhance dispersibility of the pigment pre-dispersion.

It is preferable that the pigment pre-dispersion be purged of coarse particles with a filter or a centrifuge.

The pigment pre-dispersion can be manufactured by optionally dissolving or suspending a pigment dispersant in an organic solvent, and placing a pigment in the organic solvent followed by stirring and dispersing using a known dispersing device.

Specific examples of such a dispersing device include, but are not limited to, an anchor wing, dispersing wing, homomixer, ball mill, roll mill, bead mill, sand mill, attritor, pearl mill, DYNO-MILL, high pressure homogenizer, ultrasonic dispersion device, agitator mill, paint shaker, Glen mill, Cobol mill, and jet mill. Of these, a roll mill, bead mill, sand mill, DYNO-MILL, high-pressure homogenizer, and paint shaker are preferably used to enhance dispersion efficiency.

Step 2

In the step 2, the pigment pre-dispersion obtained in the step 1 is mixed with resin to obtain a resin solution of pigment dispersion.

The resin solution of pigment dispersion obtained in the step 2 is obtained by mixing and stirring the pigment pre-dispersion obtained in the step 1, resin, and other optional substances such as a basic compound, an organic solvent, and an additive.

The device for stirring and mixing for use in the step 2 is not particularly limited. The devices mentioned in the step 1 can be used. Of these, a high performance stirrer equipped with an anchor wing or dispersing wing is preferably selected to homogeneously stir a sticky solution and efficiently dissolve powder resin.

The method of adjusting the resin solution of the pigment dispersion is not particularly limited. Resin can be directly added to the pigment pre-dispersion obtained in the step 1 or dissolved in an organic solvent before it is added to the pigment pre-dispersion.

It is preferable that the particle diameter in the resin solution of pigment dispersion be substantially the same as that of the pigment pre-dispersion obtained in the step 1. It is more preferable that both be the same in the step 1 and the step 2.

The proportion of moisture in the resin solution of pigment dispersion is preferably 20 percent by mass or less, more preferably 10 percent or less, and furthermore preferably 3 percent by mass or less. A proportion of moisture in the resin solution of pigment dispersion greater than 20 percent by mass may degrade dispersion stability of pigment, causing agglomeration. This agglomeration may increase the particle diameter of the pigment enclosing resin particles obtained in the step 3.

The resin is used to enclose pigments in the step 3. It is preferably a self-emulsifying resin. It can form an emulsion state when a resin solution and water are stirred and mixed. It preferably has a nonionic, anionic, or cationic hydrophilic group. Of these, an anionic hydrophilic group is more preferable.

It is preferable that anionic self-emulsifying resin form emulsion in an aqueous medium and the anionic groups be partially or entirely neutralized with a basic compound to keep dispersion stability in an aqueous medium.

The mass ratio of the pigment to the resin is preferably from 0.20 to 0.75, more preferably from 0.3 to 0.6, and furthermore preferably from 0.35 to 0.50 when the resin is 1. A ratio of 0.20 or greater is suitable to achieve excellent printing optical density.

A ratio of 0.75 or less makes resin cover a large part of a pigment, which reduces roughness of dried film obtained after heating, thereby enhancing the optical density.

This ratio can be calculated from the preparation ratio or obtained dispersion. It can be calculated from a dispersion by subjecting dried and fixed film of dispersion to heat analysis using a thermogravimetry-differential thermal analyzer (TG-DTA).

Specifically, a dried and fixed film of a dispersion is heated to and sustained at its thermal decomposition temperature in a nitrogen atmosphere by a TG-DTA. Thereafter, the ratio is calculated from the mass of the decomposed portion as the mass of the resin and the mass of the rest as the mass of the pigment.

Resin that is not completely decomposed by thermal decomposition in a nitrogen atmosphere because of its high temperature resistance can be calculated by the calibration curve of loss on heat and the ratio of the pigment to the resin. Specifically, mixtures of pigment and resin are prepared at arbitrary ratio. Each mixture is heated to and kept at a certain temperature to create the calibration curve. The ratio of the pigment to the resin can be calculated based on the ratio of loss obtained by the result of measuring an unknown sample.

The mass ratio (R/S) of resin (R) to organic solvent (S) in the resin solution of pigment dispersion is preferably from 1.2 to 3.0, more preferably from 1.4 to 2.5, and furthermore preferably from 1.6 to 2.0. A ratio of 1.2 or greater of the resin to the organic solvent accelerates the emulsification speed of the resin in the step 3, thereby reducing the size of the pigment enclosing resin particles. A ratio of 3.0 or less prevents the reaction system from becoming sticky. This ameliorates stirring efficiency, thereby preventing production of coarse particles.

Step 3

The liquid dispersion obtained in the step 3 is obtained by mixing the resin solution of pigment dispersion obtained in the step 2 with water. The device for stirring and mixing for use in the step 3 is not particularly limited. The devices mentioned in the step 1 can be used. Of these, a high performance stirrer equipped with an anchor wing or dispersing wing is preferably selected to homogeneously stir a sticky solution. Pigment enclosing resin particles produced may be broken and cannot maintain the enclosure when excessively high energy is applied for dispersion.

There is no specific limit to the mixing procedures of the resin solution of pigment dispersion with water. It is preferable to add water into a resin solution of pigment dispersion. Water is preferably added at from 10 to 1,000 parts per minute and more preferably from 30 to 500 parts by mass per minute to 100 parts of resin. Pigment agglomeration in the system can be prevented at from 10 to 1,000 parts per minute, thereby minimizing production of coarse pigment enclosing resin particles.

The amount of water added to resin is preferably from 70 to 700 parts by mass and more preferably from 100 to 500 parts by mass to 100 parts by mass of the resin used in the step 2 to enhance dispersion stability of the pigment enclosing resin particles.

The reaction temperature in the step 3 is preferably from 20 to 80 degrees C. and more preferably from 30 to 60 degrees C.

Step 4

The aqueous dispersion obtained in the step 4 can be obtained by purging the liquid dispersion containing the pigment enclosing resin particles obtained in the step 3 of the organic solvent.

There is no specific limit to the method of purging the liquid dispersion obtained in the step 3 of the organic solvent. Known purging systems can be suitably used. It is preferable to heat the liquid dispersion to the boiling point of the organic solvent or higher under a reduced pressure, a rotary evaporator is suitable.

The reduce pressure is preferably 200 mmHG or less and more preferably 100 mmHG or less. The heating temperature is preferably from 20 to 80 degrees C. and more preferably from 30 to 60 degrees C.

Coarse particles in the aqueous dispersion containing the pigment enclosing resin particles can be optionally removed by filter or centrifugal.

Resin

The resin is not particularly limited. Self emulsifying resin is preferable, which includes polyester, polyurethane, and acrylic. The self emulsifying resin preferably has an anionic group. It includes, but is not limited to, a carboxyl group, carboxylate group, sulfonic acid group, and sulfonate group. Of these, it is preferable to use a carboxylate group or sulfonate group all or part, in particular all of which is neutralized by a substance such as a basic compound.

Specific examples of neutralizing agents usable for neutralizing anionic groups include, but are not limited to, organic amines such as ammonium, triethylamine, pyridine, and morpholine, basic compounds such as alkanolamines such as monoethanol amine, and metal base compounds containing metal such as Na, K, Li, and Ca.

The acid value of the self emulsifying resin is preferably from 5 to 500 mgKOH/g and more preferably from 10 to 30 mgKOH/g. An acid value of 5 mgKOH or greater stables dispersion, which produces equalized particles in size, thereby enhancing dispersion and dischargibility. An acid value of 50 mgKOH or less optimizes hydrophilicity, thereby enhancing water resistance and stability as particle.

The acid value can be catalog values or calculated based on measurements. The acid value can be measured by placing polyester in a tetrahydrofuran (THF) solution followed by titration with methanol solution of potassium hydroxide at 0.1 M. When a carboxyl group in the resin in an aqueous dispersion is neutralized, an aqueous solution of hydrochloric acid is excessively added to make the system acidic followed by extracting the resin with chloroform. The pigment is removed by centrifugal or filtering followed by heating or drying under a reduced pressure to obtain dried and fixed matter of the resin. The thus-obtained resin is dissolved in THF followed by titration using methanol solution of potassium hydroxide at 0.1 M.

Polyester is described below in detail as one of the self emulsifying resin.

Polyester

Polyester is obtained by polycondensing a polyhydric alcohol with a polycarboxylic acid and/or its derivative such as a polyvalent-carboxylic acid, polycarboxylic anhydride, and polycarboxylic acid ester. It partially or entirely includes an aromatic unit. The aromatic polyester contains a polyhydric alcohol and a polycarboxylic acid and/or its derivative such as a polyvalent-carboxylic acid, polycarboxylic anhydride, and polycarboxylic acid ester as its components.

Polyhydric Alcohol

Specific examples of the polyhydric alcohol include, but are not limited to, diol such as alkylene glycols having 2 to 36 carbon atoms such as ethylene glycol, 1,2-propylene glycol. 1,3-propylene glycol, 1,4,-butylene glycol, 1,6-hexane diol, and trimethylol propane, alkylene ether glycols having 4 to 36 carbon atoms such as diethylene glycol, triethylene glycol, dipropylene glycol, polyethylene glycol, polypropylene glycol, and polybutylene glycol, alicyclic diols having 6 to 36 carbon atoms such as 1,4-cyclohexane dimethanol and hydrogenated bisphenol A, adducts (number of adduct mols of from 1 to 30 mols) of alkylene oxide having 2 to 4 carbon atoms of the alicyclic diol mentioned above such as ethylene oxide (EO), propylene oxide (PO), and butylene oxide (BO), and adducts (number of adduct mols of from 2 to 30 mols) of bisphenols such as bisphenol A, bisphenol F, and bisphenol S with alkylene oxide having 2 to 4 carbon atoms such as EO. PO, and BO.

In addition to the diols mentioned above, tri- or higher (tri- to octic or higher) alcohol components can be contained.

Specific examples include, but are not limited to, tri- to octic or higher aliphatic polyhydric alcohols having 3 to 36 carbon atoms such as alkane polyols and inner or inter molecular dehydrated matter such as glycerin, trimethylol ethane, trimethyl propane, pentaerythritol, sorbitol, sorbitan, polyglycerin, and dipenta erythritol, sugar and its derivative such as sugar and methyl glucoside, adducts (number of adduct mols of from 1 to 30 mols) of aliphatic polyols with alkylene oxide having 2 to 4 carbon atoms such as EO, PO, and BO, adducts (number of adduct mols of from 2 to 30 mols) of trisphenol such as trisphenol PA with alkylene oxide having 2 to 4 carbon atoms such as EO. PO, and BO, and adducts (number of adduct mols of from 2 to 30 mols) of novolac resin such as phenol novolac and cresol novolac with an average degree of polymerization of from 3 to 60 with alkylene oxide having 2 to 4 carbon atoms such as EO, PO, and BO. These can be used alone or in combination.

Polycarboxylic Acid Component

Specific examples of the polyvalent carboxylic acid component include, but are not limited to, dicarboxylic acids such as alkane dicarboxylic acid having 4 to 36 carbon atoms such as succinic acid, adipic acid, and sebacic acid), alkenyl succinic acid such as dodecenyl succinic acid, alicyclic dicarboxylic acid having 4 to 36 carbon atoms such as dimer acid (dimer linolic acid), alkene dicarboxylic acid having 4 to 36 carbon atoms such as maleic acid, fumaric acid, citraconic acid, and mesaconic acid, and aromatic dicarboxylic acid having 8 to 36 carbon atoms such as phthalic acid, isophthalic acid, terephthalic acid, their derivatives, and naphthalene dicarboxylic acid. Of these, alkane dicarboxylic acids having 4 to 20 carbon atoms and aromatic dicarboxylic acids having 8 to 20 carbon atoms are preferable. The polycarboxylic acid components also include anhydrides of the mentioned above or lower alkyl (with 1 to 4 carbon atoms) ester such as methyl ester, ethyl ester, and isopropyl ester. These can be used alone or in combination.

Ring-opening polymers such as polylactic acid or polycarbonate diol can be also used.

One way of isolating the polyester mentioned above is to dry and fixate an aqueous dispersion containing pigment enclosing resin particles by heating and drying; put the obtained dried matter in a THF solution to dissolve polyester; then, remove the pigment contained by centrifugal and filtering; and remove THF to isolate polyester. It is allowed to use a recycle gas permeation chromatography (GPC).

The molecular weight of the polyester has no specific limit can be suitably selected to suit to a particular application. The mass average molecular weight (Mw) is preferably from 2,000 to 15,000 and more preferably from 4,000 to 12,000 as measured by GPC.

There is no specific limitation to the glass transition temperature (TG) of the polyester and it can be suitably selected to suit to a particular application. The Tg is preferably from 30 to 100 degrees C. and more preferably from 50 to 80 degrees C.

There is no specific limitation to the softening temperature of the polyester. It is preferably from 60 to 180 degrees C. and more preferably from 80 to 150 degrees C.

The molecule structure of the polyester can be confirmed by nuclear magnetic resonance (NMR) measurement of a solution or solid. GC/MS, LC/MS, infrared (IR) absorption measurements can be also used.

The polyester mentioned above can be manufactured by any of known methods including the following method.

The polyester can be manufactured by polycondensation of the polyhydric alcohol mentioned above and the polycarboxylic acid under the absence or presence of an organic solvent.

The acid value of the polyester can be adjusted by any method. It is possible to increase the acid value by reacting the obtained polyester with a polycarboxylic acid and an anhydride of carboxylic acid.

Pigment

Inorganic pigments can be used as the pigment mentioned above.

Specific examples include, but are not limited to, titanium oxide, iron oxide, calcium carbonate, barium sulfate, aluminum hydroxide, barium yellow, cadmium red, and chromium yellow. Carbon black (C.I.Pigment Black 7) manufactured by a known method such as furnace black, lamp black, acetylene black, and channel black, and metals such as copper and iron (C.I.Pigment Black 11) can be used. Such carbon black preferably has a particle diameter of from 15 to 100 nm. Coloring property is improved in this range.

The carbon black mentioned above is measured by a TEM followed by processing the image obtained with an image analysis software (ImageJ, created by National Institutes of Health). Twenty primary particles are taken at random and the particle diameter thereof is measured by image analysis to calculate the average. Not the minor diameter but the major diameter is used for the calculation.

The absorption of the carbon black mentioned above by dibutyl phthalate (DPB) is preferably from 30 to 150 mL/100 g. Pigment dispersibility in an organic solvent is improved in this range. The DPB absorption of carbon black is measured according to JIS K6217 format.

In addition, self-dispersible pigments can be allowed. They are stably dispersed by introducing a functional group to the surface of a pigment directly or via another atom group. As the pigment before dispersion is stabilized, variety of conventional pigments specified in, for example, WO-2009/014242, can be used.

Pigment Dispersant

It is preferable to add a pigment dispersant to the pigment pre-dispersion to enhance dispersibility of a pigment. The pigment dispersant is not particularly limited and can be suitably selected to suit to a particular application. It includes a surfactant and a polymer dispersant Specific examples of the pigment dispersant include, but are not limited to, (meth)acrylic resins, styrene-(meth) acrylic resins, carboxylic acid esters including a hydroxyl group, salts of long chain polyamino amides and polar acid esters, unsaturated acid esters, copolymers, modified polyurethane, modified polyacrylate, polyether ester anionic active agents, salts of condensation products of naphthalene sulfonic acid and formalin, salts of condensation products of aromatic sulfonic acid and formalin, polyoxy ethylene alkyl phosphate, polyoxyethylene nonyl phenyl ether, and stearyl amine acetate.

The pigment dispersant mentioned above is not particularly limited regarding hydrophilicity and hydrophobicity. It can be suitably selected to suit to a particular application. Pigments are readily enclosed in resin with a hydrophobic dispersant, which is preferable to enhance the optical density. Whether the pigment dispersant mentioned above is hydrophobic or hydrophilic is determined by water-solubility. If water-soluble, it is hydrophilic and if not, it is hydrophobic.

Specific examples of the pigment pre-dispersion include, but are not limited to, JONCRYL® (manufactured by Johnson Polymer), Anti-Terra-U (manufactured by BYK Chemie), Disperbyk (manufactured by Byk Chemie), Efka (manufactured by Efka CHEMICALS), FLOWLEN (manufactured by Kyoeisha Chemical Co., Ltd.), DISPARLON (manufactured by Kusumoto Chemicals, Ltd.), AJISPER (manufactured by Ajinomoto Fine-Techno Co., Inc.), DEMOL, HOMOGENOL, and EMULGEN (all manufactured by Kao Corporation), Solsperse (manufactured by The Lubrizol Corporation), and NIKKOL (manufactured by Nikko Chemicals Co., Ltd.).

Ink

The organic solvent, water, coloring material, resin, and additive for use in the ink are described below.

Organic Solvent

There is no specific limitation to the organic solvent for use in the present disclosure. For example, a water-soluble organic solvent can be used. It includes, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples include, but are not limited to, polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petrol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying property at the same time.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monomethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

A polyol compound having eight or more carbon atoms and a glycol ether compound enhance permeability of ink for paper used as a recording medium.

The proportion of the organic solvent in ink has no particular limit and can be suitably selected to suit to a particular application.

In terms of drying and discharging reliability of the ink, the proportion is preferably from 10 to 60 percent by mass and more preferably from 20 to 60 percent by mass.

Water

The proportion of water in the ink is not particularly limited and can be suitably selected to suit to a particular application; it is preferably from 10 to 90 percent by mass and more preferably from 20 to 60 percent by mass to enhance the drying property and discharging reliability of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as optical density. The solid content includes resin particles and particles of pigment. The particle diameter can be measured by using a particle size analyzer (Nanotrac Wave-UT151, manufactured by MicrotracBEL Corp).

Additive

The ink may further optionally include additives such as a surfactant, defoaming agent, preservative and fungicide, corrosion inhibitor, and pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both terminal-modified polydimethyl siloxane, one-terminal-modified polydimethyl siloxane, and side chain both-terminal-modified polydimethyl siloxane. In particular, a polyether-modified silicone-based surfactant having a polyoxyethylene group or a polyoxyethylene polyoxypropylene group is particularly preferable because such a surfactant demonstrates good property as the aqueous surfactant.

Such surfactants can be synthesized or procured. The products can be procured from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

Chemical Formula S-1

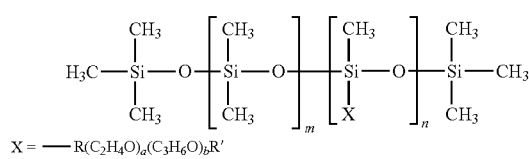

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain.

Of these, polyoxyalkylene ether polymer compounds having a perfluoroalkyl ether group in the side chain thereof are preferable because these polymer compounds do not easily foam and the fluorosurfactant represented by the following Chemical Formula F-1 or Chemical Formula F-2 is more preferable.

Chemical Formula F-1

In the compound represented by Chemical Formula F-1. "m" is preferably 0 or an integer of from 1 to 10 and "n" is preferably 0 or an integer of from 1 to 40.

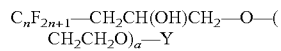

Chemical Formula F-2

In the Chemical Formula F-2, Y represents H, $C_mF_{2m+1}$, where "m" is an integer of from 1 to 6, $CH_2CH(OH)CH_2$—$C_mF_{2m+1}$, where "m" represents an integer of from 4 to 6, or $C_pH_{2p+1}$, where p represents an integer of from 1 to 19, n represents an integer of from 1 to 6, a represents an integer of from 4 to 14.

The fluorochemical surfactant is commercially available. Specific examples include, but are not limited to, SURFLON S-111, S-112, S-113, S-121, S-131, S-132, S-141, and S-145 (all manufactured by ASAHI GLASS CO., LTD.): FLUORAD FC-93, FC-95, FC-98. FC-129. FC-135, FC-170C, FC-430, and FC-431 (all manufactured by Sumitomo 3M Limited); MEGAFACE F-470, F-1405, and F-474 (all manufactured by DIC CORPORATION): ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company): FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES. Ltd.). Of these, in terms of improvement on print quality, in particular coloring property and permeability, wettability, and uniform dying property on paper, FS-3100, FS-34, and FS-300 of The Chemours Company, FT-110. FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass to achieve excellent wettability and discharging stability and improve image quality.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazolone-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to be not lower than 7. Specific examples include, but are not limited to, amines such as diethanol amine and triethanol amine.

Properties of the ink are not particularly limited and can be suitably selected to suit to a particular application; viscosity, surface tension, and pH are preferable in the following ranges.

The ink preferably has a viscosity of from 5 to 30 mPa·s and more preferably from 5 to 25 mPa·s at 25 degrees C. to enhance the print density and text quality and achieve a good dischargibility. Viscosity can be measured by equipment such as a rotatory viscometer (RE-80L, manufactured by TOKI SANGYO CO., LTD.). The measuring conditions areas follows:

Standard cone rotor (1°34'×R24)

Sample liquid amount: 1.2 ml

Rate of rotation: 50 rotations per minute (rpm)

25 degrees C.

Measuring time: three minutes.

The surface tension of the ink is preferably 35 mN/m or less and more preferably 32 mN/m or less at 25 degrees C. because the ink suitably levels on a recording medium and the ink dries in a shorter time.

pH of the ink is preferably from 7 to 12 and more preferably from 8 to 11 to prevent corrosion of metal material in contact with liquid.

Pre-Processing Fluid

The pre-processing fluid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in ink. Other material for use in known processing fluid can be used.

The type of the flocculant is not particularly limited. For example, water-soluble cationic polymers, acids, and multivalent metal salts are suitable.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

Recording Medium

The recording medium is not particularly limited. Materials such as plain paper, gloss paper, special paper, and cloth are usable. Also, good images can be formed on a non-permeable substrate.

The non-permeable substrate has a surface with low moisture permeability and absorbency and includes a material having a number of hollow spaces inside that are not open to the outside. To be more quantitative, the substrate has a water-absorbency of 10 or less mL/m$^2$ from the start of the contact until 30 msec$^{1/2}$ later according to Bristow's method.

For example, plastic films such as vinyl chloride resin film, polyethylene terephthalate (PET) film, polypropylene film, polyethylene film, and polycarbonate film are suitably used as the non-permeable substrate.

The recording media are not limited to typical recording media and suitably include building materials such as wall paper, floor material, and tiles, cloth for apparel such as T-shirts, textile, and leather. The configuration of the paths through which the recording medium is conveyed can be changed to use materials such as ceramics, glass, and metal.

Recorded Matter

Ink recorded matter includes a recording medium and an image formed on the recording medium with the ink contained in the ink set of the present disclosure.

The recorded matter is obtained by an inkjet recording device executing an inkjet recording method.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording device and the recording method respectively represent a device capable of discharging ink and liquids such as various processing fluids to a recording medium and a method of recording utilizing such a device. The recording medium means an item to which ink or various processing fluids can be temporarily or permanently attached.

The recording device may further optionally include a device relating to feeding, conveying, and ejecting a recording medium and other devices referred to as a pre-processing device, a post-processing device in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as text and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium having, for example, A0 size, and a continuous printer capable of using continuous paper rolled up in a roll-like form as a recording medium.

Figure 8:
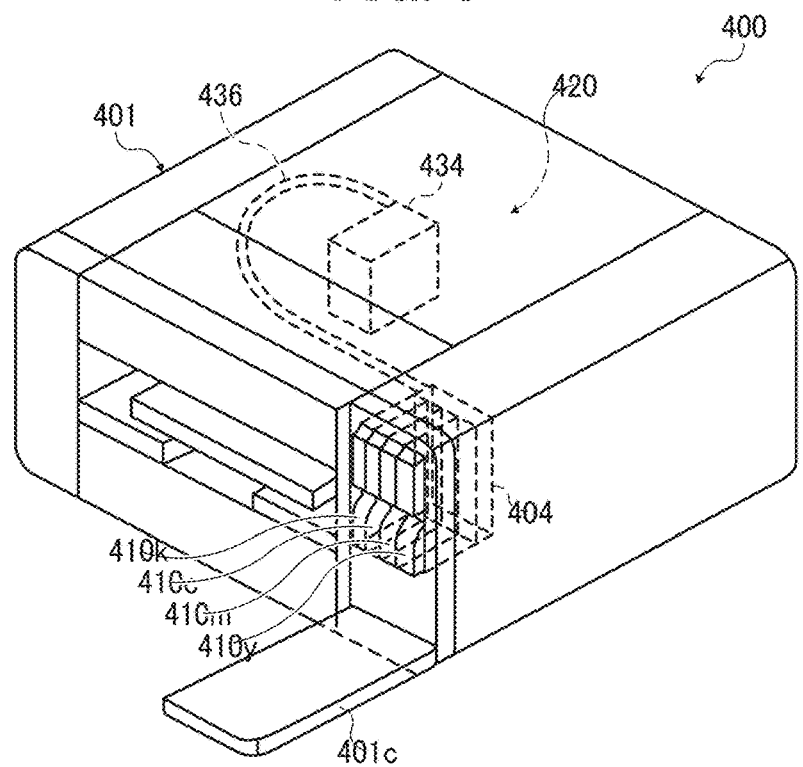
FIG. 8 is a diagram illustrating a perspective view of another example of a recording device.
Figure 9:
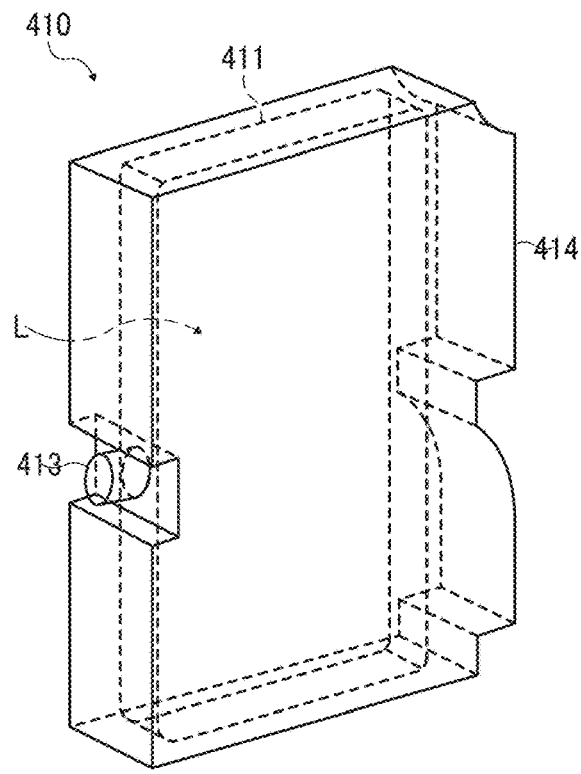
FIG. 9 is a diagram illustrating a perspective view of a tank.

The recording device is described using an example with reference to FIG. 8 and FIG. 9. FIG. 8 is a diagram illustrating a perspective view of the image forming apparatus. FIG. 9 is a diagram illustrating a perspective view of a tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414 and L represents liquid contained in the ink accommodating unit 411. As a result, the tank 410 is used as an ink cartridge of each color.

A cartridge holder 404 is disposed on the rear side of the opening appearing when a cover 401c is opened. The tank 410 is detachably attached to the cartridge holder 404. In this configuration, each ink discharging outlet 413 of the tank 410 communicates with a discharging head 434 for each color via a supplying tube 436 for each color and the ink can be discharged from the discharging head 434 to a recording medium.

This recording device may include not only a portion for discharging ink but also a device referred to as a pre-processing device and a post-processing device.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

Figure 7:
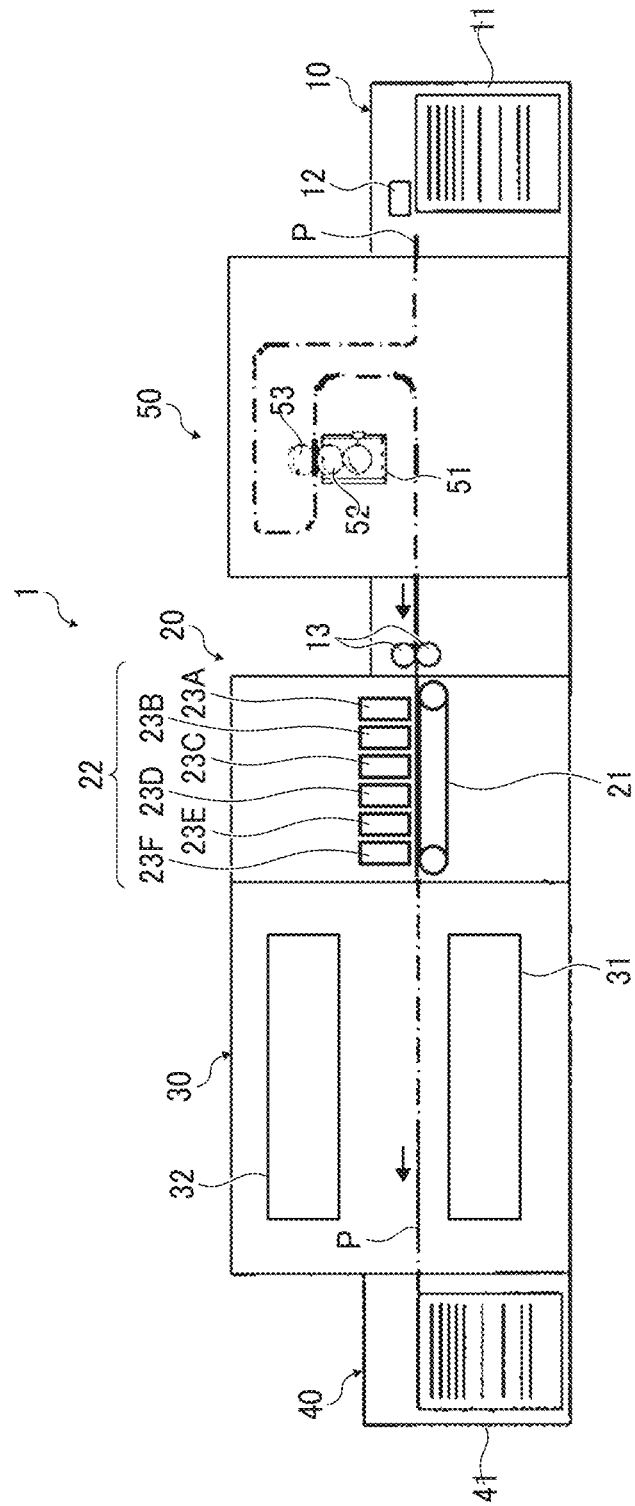
FIG. 7 is a schematic diagram illustrating an example of a recording device.

FIG. 7 is a diagram illustrating an embodiment of a printing device (printer) using the ink of the present disclosure.

A printer 1 includes a feeding unit 10, a pre-processing unit 50, a printing unit 20, a drying unit 30, and an ejecting unit 40. The printer 1 applies processing fluid at the pre-processing unit 50 to a sheet P conveyed from the feeding unit 10. It applies liquid to the sheet P at the printing unit 20 for determined printing. Thereafter, the liquid on the sheet P is dried at the drying unit 30. The sheet P is then ejected to the ejecting unit 40.

The feeding unit 10 includes a feeding tray 11 carrying multiple sheets P, a feeding device 12 that separates the sheets P one sheet by one sheet and sends out from the feeding tray 11, and a pair of registration rollers 13 that feeds the sheets P to the printing unit 20.

The feeding device 12 may include any feeding device such as a device using a roller or a device utilizing air suction. After the front end of the sheet P fed from the feeding tray 11 by the feeding device 12 reaches the registration rollers 13, it is sent out to the printing unit 20 by the operation of the registration rollers 13 at a certain timing.

The pre-processing unit 50 includes a processing fluid container 51 containing processing fluid that reacts with the liquid to minimize bleeding and a pre-application processing rotation body as a processing liquid application device that applies the processing fluid to the sheet P. The pre-application processing rotation body includes a drawing roller for drawing the processing fluid, an application roller 52 that receives the processing fluid attached to the drawing roller and applies the processing fluid to the surface of the sheet P, and a roller 53 that pinches the sheet P by pressing it against the application roller 52.

After the processing fluid is applied to the rear side of the sheet P by the application roller 52, the sheet P is reversed and fed into the registration rollers 13 constituting the feeding unit 10.

The printing unit 20 includes a sheet conveyor 21 that conveys the sheet P. The sheet conveyor 21 includes a belt that bears and conveys the sheet P and a suction device producing suction power at the surface of the belt.

The printing unit 20 includes a liquid discharging unit 22 that discharges and applies the liquid to the surface of the sheet P borne and conveyed by the sheet conveyor 21 to attach the processing fluid to the surface.

The liquid discharging unit 22 includes a discharging unit 23 (23A to 23F) as a liquid application device. For example, the discharging unit 23A, the discharging unit 23B, the discharging 23C, and the discharging unit 23D respectively discharge liquid of cyan (C), liquid of magenta (M), liquid of yellow (Y), and liquid of black (K). The discharging unit 23F is used to discharge either one of YMCK or a special liquid having a color such as white, silver, and gold. A discharging unit that discharges processing fluid such as surface coating liquid can be added.

One embodiment of the discharging unit 23 is a full line head constituted of multiple liquid discharging heads (hereinafter simply referred to as head), each having nozzle lines including multiple nozzles respectively.

Each of the discharging units 23 of the liquid discharging unit 22 is controlled by drive signals in accordance with the printing information. The discharging units 23 discharge each color liquid when the sheet P borne on the drum passes through the opposition region of the liquid discharging unit 22. Images corresponding to the printing information are printed on the sheet P.

The sheet P to which the liquid is applied by the liquid discharging unit 22 is conveyed to a suction conveyance mechanism 31 of the drying unit 30.

The drying unit 30 includes the suction conveyance mechanism 31 as a conveying device that conveys the sheet P while it is suctioned and a drying mechanism 32 that dries the liquid on the sheet P conveyed by the suction conveyance mechanism 31.

The sheet P where the liquid is applied at the printing unit 20 is dried at the drying mechanism 32 while the sheet P is conveyed by the suction conveyance mechanism 31. Thereafter, the sheet P is sent to the ejecting unit 40.

The ejecting unit 40 includes an ejection tray 41 at which the sheets P is stacked. The sheet P conveyed from the drying unit 30 is sequentially stacked on the ejection tray 41 and stored.

Although the pre-processing unit 50 is configured to apply the processing fluid to one side of the sheet P in this embodiment, the configuration is not limited thereto. The pre-processing unit 50 may include another processing fluid container, which can be deposited downstream of the processing fluid container 51 in the conveyance direction of the sheet P to apply the processing fluid to the other side of the sheet P. Alternatively, the pre-processing unit 50 is configured to reverse the sheet P that has once passed through the processing liquid container 51 and then apply the processing fluid to the other side of the sheet P when it passes through the processing fluid container 51 again.

Notably, the ink is applicable not only to the inkjet recording but can be widely applied in other methods.

Specific examples of such methods other than the inkjet recording include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to produce two-dimensional text and images and furthermore used as a material for solid fabrication for manufacturing a solid fabrication object (or solid freeform fabrication object).

The solid fabrication apparatus to fabricate a solid fabrication object can be any known device with no particular limit. For example, the apparatus includes a container, supplying device, discharging device, drier of ink, and others. The solid fabrication object includes an object manufactured by repetitively coating ink. In addition, the solid fabrication object includes a mold-processed product manufactured by processing a structure having a substrate such as a recording medium to which the ink is applied. The mold-processed product is manufactured from recorded matter or a structure having a form such as a sheet-like form, and film-like form, by, processing such as heating drawing or punching. The molded processed product is suitably used for articles which are molded after surface-decorating. Examples are gauges or operation panels of vehicles, office machines, electric and electronic devices, cameras, etc.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto. In the following description, "parts" means "parts by mass" unless otherwise specified, and "percent" means "percent by mass" unless otherwise specified.

The 50 percent cumulative volume particle diameter (D50) is hereinafter referred to as D50.

First, the methods of evaluating the properties in Synthesis Examples, Manufacturing Examples, Preparation Examples, Examples, and Comparative Examples are described.

Evaluation Method
Molecular Weight

Device: GPC (manufactured by TOSOH CORPORATION, detector: RI, measuring temperature: 40 degrees C., mobile phase: tetrahydrofuran, amount of flow: 0.45 mL/min.

The number average molecular weight (Mn), weight average molecular weight (Mw), and molecular weight distribution (Mw/Mn) are each measured by gel permeation chromatography (GPC) using a calibration curve prepared based on a polystyrene sample having a known molecular weight as reference. The column was composed of those connected in serial, each having an exclusion limit of 60,000, 20,000, and 10,000.

D50

D50 of the pigment pre-dispersion was measured by a dynamic light scattering method using a zeta potential-particle size measuring system (ELSZ-1000, manufactured by OTSUKA ELECTRONICS Co., LTD.). Specifically, a sample for measurement was diluted with deionized water and optionally an organic solvent to have a solid content concentration of 0.01 weight percent. The obtained solution was placed in a quartz cell. The cell was placed in a sample holder. Thereafter, the sample was measured under the conditions of a temperature at 25 degrees C., dust cut (5 times, Upper: 5, Lower: 100), and number of repeated times of 70.

A laser diffraction/scattering particle diameter distribution measuring device (LA-960, manufactured by HORIBA, Ltd.) was used to measure the D50 of an aqueous dispersion containing pigment enclosing resin particles.

Specifically, the sample was diluted with deionized water to make transmission ratio R and the transmission ratio B from 30 to 70 percent at the measurement by the device mentioned above. The obtained solution was partially placed in a batch cell (spacer of 50 μm), which was then placed in a sample holder.

Pigment Exposure Ratio

The pigment exposure ratio was calculated based on the amount of pigments exposed to the surface of coated film observed by an SEM.

Specifically, an aqueous dispersion or ink is prepared using deionized water to achieve a solid content concentration of 10.75 percent. This aqueous dispersion or ink is applied to coated paper (LumiArt Gloss 130) with a 0.15 mm bar coater followed by drying at 25 degrees C. for one night. This dried coating film is cut out and fixed onto a stub for SEM observation with carbon tape. This fixed film is observed without electroconductivity treatment with an SEM (Merlin, manufactured by ZEISS) equipped with a reflected electron detector at an acceleration voltage of 0.75 kV and 2,000 to 20,000× magnification). According to this observation, exposed pigments are discerned due to the difference in the amount of reflected electron emitted between carbon black and the resin. The ratio of the area of the pigment to the entire of the coated film in the 20,000× magnification image is defined as the pigment exposure ratio. The pigment ratio was classified as follows. The ratio of the area of pigments in the entire surface of the coated film was obtained by digitization of the SEM image. The ratios in three fields of vision obtained by arbitrarily changing the observation points were averaged.

Surface Roughness

The surface roughness was calculated as follows using a scanning probe microscope (SPM).

An aqueous dispersion containing pigment enclosing resin particles having a solid content concentration of 10.75 percent by mass was prepared using deionized water. This aqueous dispersion was applied to coated paper (LumiArt Gloss 130) with a 0.15 mm bar coater followed by drying at 100 degrees C. in an oven for five minutes. This coated film was cut out followed by observation under the following conditions to calculate the surface roughness. Three fields of vision in the coated film were observed by arbitrarily changing the observation points. The average (nm) of the surface roughness values was obtained.

Instrument: SPM (DimensionIcon, manufactured by Bruker)
Cantilever: OMCL-AC240TS, manufactured by Olympus Corporation
Measurement mode: tapping mode
Observation range: 2 μm square Abundance Ratio of Pigment Enclosing Resin Particles The abundance ratio of pigment enclosing resin particles was evaluated based on the observation as follows. An emulsion containing pigment enclosing resin particles is diluted with deionized water to obtain a sample liquid having a solid content concentration of 0.1 percent. Next, 1 μl of the sample liquid is placed on a hydrophilized collodion film attached mesh (Cu 150 mesh, manufactured by NISSIN EM CO., LTD.) using a micro pipette. Immediately thereafter, it is absorbed by triangle-shaped filter paper. Next, 1 μl of Em stainer diluted with a factor of 10 is placed on the mesh. Immediately thereafter, it is absorbed by triangle-shaped filter paper. Subsequent to drying under a reduced pressure, the sample remaining on the mesh is observed with a TEM (JEM-2100F, manufactured by JEOL Ltd.) at an acceleration voltage of 200 kV and 40,000× magnification. According to this observation method, five or more images each having at least three particles of 50 nm or greater are obtained while arbitrarily changing fields of vision. The ratio of the number of pigment enclosing resin particles to the particles of 50 nm or greater is calculated for each image. The average of the ratios is calculated. This average is defined as the abundance ratio of pigments enclosing resin particles in particles.

Aspect Ratio

The aspect ratio was obtained by image processing of the images of the particles obtained by observing the pigment enclosing resin particles using the TEM mentioned above. In fact, while changing observation points, multiple images including pigment enclosing resin particles are obtained in different fields of vision. Pigment enclosing resin particles without overlapping other particles are extracted by digitization using image analysis software (ImageJ, created by National Institutes of Health) followed by particle analysis. The ratio of the major axis to the minor axis of the ellipse most approximate to a particle is determined as the aspect ratio. The aspect ratios of 20 particles are used to calculate the average thereof.

Manufacturing Example

SSelf-emulsifying resin: Synthesis Example of Polyester
Synthesis of Polyester α

First, 275 parts by mass of an adduct of bisphenol A with 2 mols of ethylene oxide (4,4'-isopropylidene bis(2-phenoxy ethanol), manufactured by Fuji Film Wako Chemicals) and 79 parts of an adduct of bisphenol A with 2 mols of propylene oxide (BA-P2 glycol, manufactured by Nippon Nyukazai Co., Ltd.) as diols, 140 parts of dimethyl isophthalate and 26 parts of adipic acid as dicarboxylic acids were mixed in a four-necked flask (500 mL) equipped with a nitrogen introducing tube, a dehydration tube, a stiffer, and a thermocouple. Subsequent to sufficient replacement with nitrogen gas in the reaction vessel, 300 ppm (based on the monomer) of titanium tetraisopropoxide was added, and the temperature was raised to 200 degrees C. in about four hours in a nitrogen atmosphere. Thereafter, the temperature was raised to 230 degrees C. over two hours to continue the reaction until no effluent was produced. Thereafter, the reaction was caused to continue under a reduced pressure of from 5 to 30 mm Hg for one hour to obtain polyester.

The thus-obtained resin had an acid value (AV) of 0.5 mg KOH/g, a glass transition temperature (Tg) of 47 degrees C., and a weight average molecular weight (Mw) of 5,000.

A total of 160 parts of the obtained polyester was melted at 180 degrees C. in a nitrogen atmosphere followed by an addition of 6 parts of trimellitic anhydride. The mixture was stirred for 40 minutes to adjust the acid value of the resin. The obtained polyester α had an acid value (AV) of 20 mgKOH/g, a glass transition temperature (Tg) of 51 degrees C., and a mass average molecular weight (Mw) of 5,100.

Synthesis of Polyester β

A total of 280 parts of propylene glycol as diol and 611 parts of terephthalic acid and 109 parts of succinic acid as dicarboxylic acids were mixed in a four-necked flask (1,000 ml) equipped with a nitrogen introducing tube, a dehydration tube, a stirrer, and a thermocouple. Subsequent to sufficient replacement with nitrogen gas in the reaction vessel, 300 ppm (based on the monomer) of titanium tetraisopropoxide was added, and the temperature was raised to 200 degrees C. in about four hours in a nitrogen atmosphere. Thereafter, the temperature was raised to 230 degrees C. over two hours to continue the reaction until no effluent was produced. Thereafter, the reaction was caused to continue under a reduced pressure of from 5 to 30 mm Hg for one hour to obtain polyester β.

The thus-obtained polyester β had an acid value (AV) of 19 mg KOH/g, a glass transition temperature (Tg) of 57 degrees C., and a weight average molecular weight (Mw) of 6,000.

Synthesis of Polyester γ

First, 146 parts of propylene glycol, 54.6 parts by mass of an adduct of bisphenol A with 2 mols of ethylene oxide (4,4'-isopropylidene bis(2-phenoxy ethanol), manufactured by Fuji Film Wako Chemicals) and 250.7 parts of an adduct of bisphenol A with 2 mols of propylene oxide (BA-P2 glycol, manufactured by Nippon Nyukazai Co., Ltd.) as diol, 6.4 parts of trimethylol propane as triol, and 193.7 parts of dimethyl terephthalate as dicarboxylic acid were mixed in a four-necked flask (500 mL) equipped with a nitrogen introducing tube, a dehydration tube, a stirrer, and a thermocouple. Subsequent to sufficient replacement with nitrogen gas in the reaction vessel, 300 ppm (based on the monomer) of titanium tetraisopropoxide was added, and the temperature was raised to 200 degrees C. in about four hours in a nitrogen atmosphere. Thereafter, the temperature was raised to 230 degrees C. over two hours to continue the reaction until no effluent was produced. Thereafter, the reaction was caused to continue under a reduced pressure of from 5 to 30 mm Hg for four hours to obtain polyester.

The thus-obtained resin had an acid value (AV) of 0.4 mg KOH/g, a glass transition temperature (Tg) of 80 degrees C., and a weight average molecular weight (Mw) of 25,000.

A total of 150 parts of the obtained polyester was melted at 180 degrees C. in a nitrogen atmosphere followed by an addition of 4.2 parts of trimellitic anhydride. The mixture was stirred for 40 minutes to adjust the acid value of the resin. The obtained polyester α had an acid value (AV) of 20 mgKOH/g, a glass transition temperature (Tg) of 81 degrees C., and a mass average molecular weight (Mw) of 26,000.

Pigment Pre-Dispersion
Synthesis of Pigment Dispersant I

A total of 10.0 parts of 12-hydroxy stearic acid (manufactured by Tokyo Chemical Industry Co. Ltd.). 100.0 parts of ε-caprolactone (manufactured by Tokyo Chemical Industry Co. Ltd.), and 0.02 parts of tetrabutyl titanate (manufactured by Tokyo Chemical Industry Co. Ltd.) were placed in a flask equipped with a mechanical stirrer, a thermometer, a nitrogen gas introducing tube, and a reflux tube after the atmosphere in the flask was sufficiently replaced with nitrogen.

Thereafter, 12.0 parts of polyethylene imine (SP-200, manufactured by Nippon Shokubai Co., Ltd.) was added. The system was heated at 150 degrees C. for four hours to obtain Pigment Dispersant I.

Pigment Pre-Dispersion A

The following recipe was mixed and placed in a glass screw tube bin (110 ml). Thereafter, 170 parts of zirconia balls having a diameter of 2.0 mm (YTZ ball, manufactured by NIKKATO CORPORATION) was added. The bin was fixed in a shaker (Vibrax VXR basic, manufactured by IKA Company) for stirring at 1,000 rpm for 24 hours. Thereafter, the obtained liquid dispersion was filtered with a PTFE membrane filter having an average pore diameter of 5.0 μm. The media were separated from the liquid dispersion to prepare a pigment pre-dispersion A. D50 of this pigment pre-dispersion was 110 nm by ELSZ-1000.

| Carbon black: | 15.0 parts (SBX45, primary particle diameter of 22 nm, DPB absorption amount of 55 mL/100 g, manufactured by ASAHI CARBON CO., LTD.) |
| Liquid dispersant: | 3.8 parts (AJISPER PB821, hydrophilic, Ajinomoto Fine-Techno Co., Inc.) |
| Methylethyl ketone: | 41.2 parts |

Pigment Pre-Dispersion B

The following recipe was mixed and placed in a glass screw tube bin (110 ml). Thereafter, 170 parts of zirconia balls having a diameter of 2.0 mm (YTZ ball, manufactured by NIKKATO CORPORATION) was added. The bin was fixed in a shaker (Vibrax VXR basic, manufactured by IKA Company) for stirring at 1,000 rpm for 24 hours. Thereafter, the dispersion was filtered with a PTFE membrane filter having an average pore diameter of 5.0 μm. The media were separated from the liquid dispersion to prepare a pigment pre-dispersion B. D50 of this pigment pre-dispersion was 110 nm by ELSZ-1000.

| Carbon black: | 15.0 parts (SBX45, primary particle diameter of 22 nm, DPB absorption amount of 55 mL/100 g, manufactured by ASAHI CARBON CO., LTD.) |
| Pigment dispersant: | 3.8 parts (BYKJET-9151, hydrophilic, manufactured by BYK Chemie) |
| Methylethyl ketone: | 41.2 parts |

Pigment Pre-Dispersion C

The following recipe was mixed and placed in a glass screw tube bin (110 ml). Thereafter, 170 parts of zirconia balls having a diameter of 2.0 mm (YTZ ball, manufactured by NIKKATO CORPORATION) was added. The bin was fixed in a shaker (Vibrax VXR basic, manufactured by IKA Company) for stirring at 1,000 rpm for 24 hours. Thereafter, the dispersion was filtered with a PTFE membrane filter having an average pore diameter of 5.0 μm. The media were separated from the liquid dispersion to prepare a pigment pre-dispersion C. D50 of this pigment pre-dispersion was 155 nm by ELSZ-1000.

| Carbon black: | 5.0 parts (ASAHI #15, primary particle diameter of 122 nm, DPB absorption amount of 41 mL/100 g, manufactured by ASAHI CARBON CO., LTD.) |
| Liquid dispersant: | 3.8 parts (AJISPER PB821, hydrophilic, Ajinomoto Fine-Techno Co., Inc.) |
| Methylethyl ketone: | 41.2 parts |

Pigment Pre-Dispersion D

The following recipe was mixed and placed in a glass screw tube bin (110 ml). Thereafter, 170 parts of zirconia balls having a diameter of 2.0 mm (YTZ ball, manufactured by NIKKATO CORPORATION) was added. The bin was fixed in a shaker (Vibrax VXR basic, manufactured by IKA Company) for stirring at 1,000 rpm for 24 hours. Thereafter, the dispersion was filtered with a PTFE membrane filter having an average pore diameter of 5.0 μm. The media were separated from the liquid dispersion to prepare a pigment pre-dispersion D. D50 of this pigment pre-dispersion was 113 nm by ELSZ-1000.

| Carbon black: | 15.0 parts (SBX45, primary particle diameter of 22 nm, DPB absorption amount of 55 mL/100 g, manufactured by ASAHI CARBON CO., LTD.) |
| Pigment dispersant I (hydrophobic): | 3.8 parts |
| Methylethyl ketone: | 41.2 parts |

Preparation Examples using the aqueous dispersions 1 to 17 and the ink 1 to 15 using the aqueous dispersions are described below.

The properties of the aqueous dispersions and the evaluation results of the inks are shown in Table 1.

Example 1

Preparation of Aqueous Dispersion 1

A total of 60 g of pigment pre-dispersion A and 30 g of polyester a were added to a 0.3 litter separable flask equipped with a three one motor, an anchor wing, and a thermocouple in such a manner that the mass ratio (P/R) of pigment (P) to polyester (R: resin) was 0.5 followed by mixing and stirring at 40 degrees C. to obtain a resin solution of pigment dispersion. Next, the solution was purged of methylethyl ketone under a reduced pressure in such a manner that the ratio (R/S) of polyester to methylethyl ketone (S: solvent) was 1.4. A total of 1.1 g of triethyl amine equivalent to the carboxyl group was added to neutralize the acid value of the polyester followed by mixing and stirring for 0.5 hours. While stirring at 350 rpm, 64 g of deionized water was dripped at 15 ml/min followed by a 20 minute stirring to obtain an emulsion. The emulsion was purged of methylethyl ketone followed by filtering with a nylon net having an opening of 67 μm. The solid component of the resulting substance was adjusted with deionized water to 30 percent to obtain an aqueous dispersion 1 containing pigment enclosing resin particles having at least two primary pigment particles.

Figure 1A:
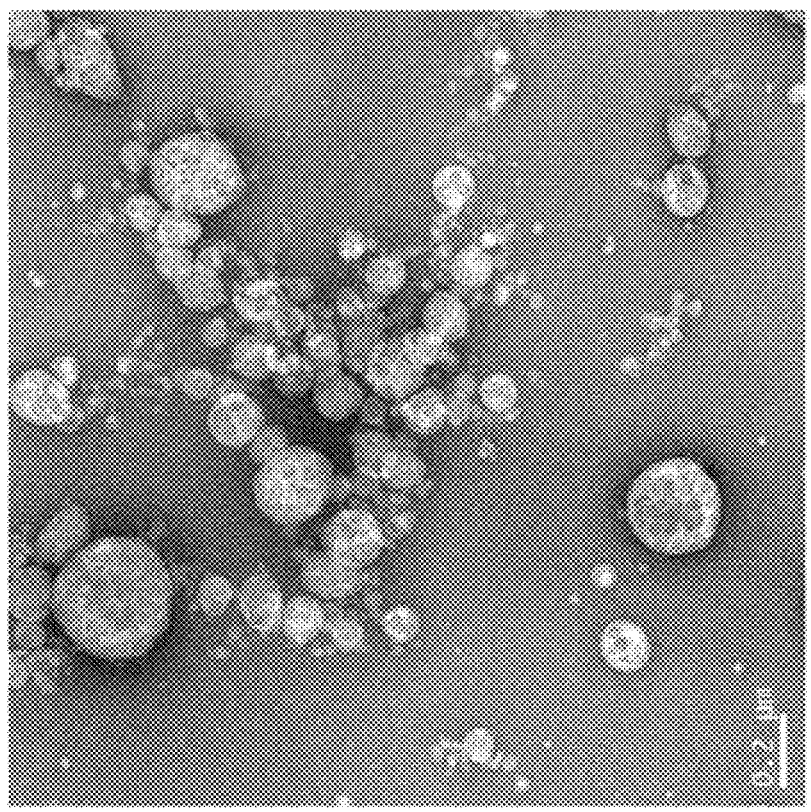
Figure 2:
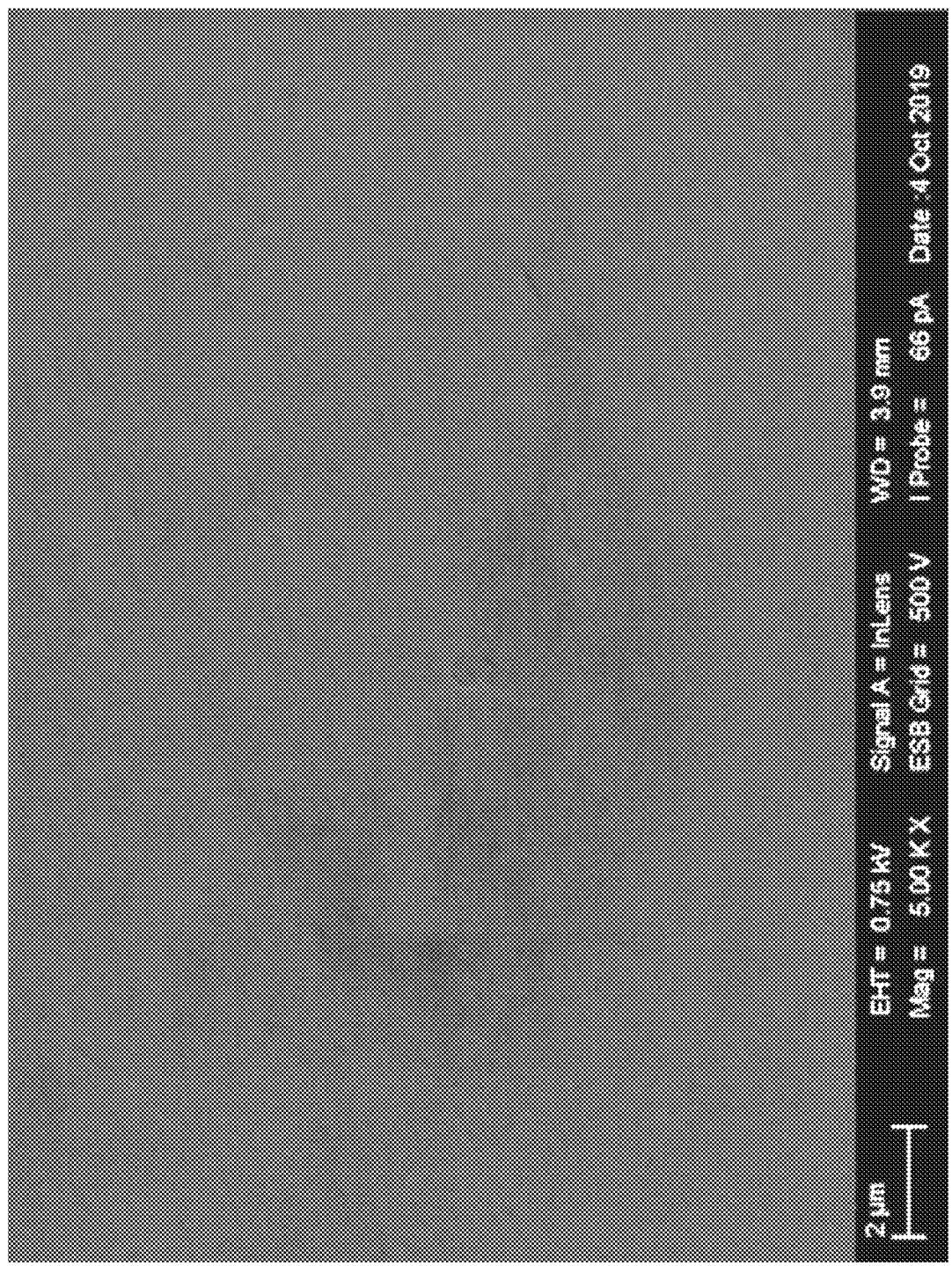
FIG. 2 is a scanning electron microscope (SEM) image illustrating an aqueous dispersion containing pigment enclosing emulsion resin particles produced in Example 1, which is described later.

FIG. 1 is a TEM image of the aqueous dispersion 1 and FIG. 2 is an SEM image thereof. The TEM image of FIG. 1 illustrates the state in which pigments are enclosed in spherical resin emulsions.

Preparation of Ink 1

The ink of the following recipe was adjusted to have a viscosity of 7.5 mPa·s at 25 degrees C. using the aqueous dispersion 1 followed by filtering with a membrane filter having an average pore diameter of 10 μm to prepare Ink 1.

Ink Recipe

Aqueous dispersion 1 (solid): 10.75 percent

Propylene glycol (prepared to have a viscosity of 7.5 mPa·s): about 40 percent

Silicone-based surfactant: 1.0 percent (Silface SAG503A, manufactured by Nissin Chemical co., ltd.)

Aliphatic dialcohol-based surfactant: 0.1 percent (Surfynol AD01, manufactured by Nissin Chemical co., ltd.)

Water: Balance

Total: 100 percent

Example 2

Aqueous dispersion 2 containing pigment enclosing resin particles having at least two primary pigment particles was obtained in the same manner as in Example 1 except that the ratio (R/S) was changed to 2.0. Ink 2 was prepared in the same manner as in the manufacturing of Ink 1 except that the aqueous dispersion 2 was used instead of the aqueous dispersion 1.

Example 3

Aqueous dispersion 3 containing pigment enclosing resin particles having at least two primary pigment particles was obtained in the same manner as in Example 1 except that the ratio (R/S) was changed to 1.8 and the ratio (P/R) was changed to 0.20. Ink 3 was prepared in the same manner as in the manufacturing of Ink 1 except that the aqueous dispersion 3 was used instead of the aqueous dispersion 1.

Example 4

Aqueous dispersion 4 containing pigment enclosing resin particles having at least two primary pigment particles was obtained in the same manner as in Example 1 except that the ratio (P/R) was changed to 0.35. Ink 4 was prepared in the same manner as in the manufacturing of Ink 1 except that the aqueous dispersion 4 was used instead of the aqueous dispersion 1.

Example 5

Aqueous dispersion 5 containing pigment enclosing resin particles having at least two primary pigment particles was obtained in the same manner as in Example 1 except that the pigment pre-dispersion D was used instead of the pigment pre-dispersion A and the ratio (P/R) was changed to 0.55. Ink 5 was prepared in the same manner as in the manufacturing of Ink 1 except that the aqueous dispersion 5 was used instead of the aqueous dispersion 1.

Example 6

Aqueous dispersion 6 containing pigment enclosing resin particles having at least two primary pigment particles was obtained in the same manner as in Example 1 except that the polyester β was used instead of the polyester α and the ratio (R/S) was changed to 1.8. Ink 6 was prepared in the same manner as in the manufacturing of Ink 1 except that the aqueous dispersion 6 was used instead of the aqueous dispersion 1.

Example 7

Aqueous dispersion 7 containing pigment enclosing resin particles having at least two primary pigment particles was obtained in the same manner as in Example 1 except that the amount of triethylamine that was used to neutralize the acid value of the polyester was changed to 0.75 equivalent. Ink 7 was prepared in the same manner as in the manufacturing of Ink 1 except that the aqueous dispersion 7 was used instead of the aqueous dispersion 1.

Example 8

Aqueous dispersion 8 containing pigment enclosing resin particles having at least two primary pigment particles was obtained in the same manner as in Example 1 except that the ratio (P/R) was changed to 0.60. Ink 8 was prepared in the same manner as in the manufacturing of Ink 1 except that the aqueous dispersion 8 was used instead of the aqueous dispersion 1.

Comparative Example 1

Aqueous dispersion 9 was obtained in the same manner as in Example 1 except that the polyester γ was used instead of the polyester a and the ratio (P/R) was changed to 0.20. Ink 9 was prepared in the same manner as in the manufacturing of Ink 1 except that the aqueous dispersion 9 was used instead of the aqueous dispersion 1.

Comparative Example 2

Aqueous dispersion 10 containing pigment enclosing resin particles having at least two primary pigment particles was obtained in the same manner as in Example 1 except that the dripping rate of the deionized water was changed to 1 ml/min.

Ink 10 was prepared in the same manner as in the manufacturing of Ink 1 except that the aqueous dispersion 10 was used instead of the aqueous dispersion 1. Solid images were not properly printed because many of the nozzles were clogged in the inkjet evaluation.

Comparative Example 3

Aqueous dispersion 11 was obtained in the same manner as in Example 1 except that the pigment pre-dispersion B was used instead of the pigment pre-dispersion A. Ink 11 was prepared in the same manner as in the manufacturing of Ink 1 except that the aqueous dispersion 11 was used instead of the aqueous dispersion 1.

Comparative Example 4

Aqueous dispersion 12 containing pigment enclosing resin particles having at least two primary pigment particles was obtained in the same manner as in Example 1 except that the pigment pre-dispersion C was used instead of the pigment pre-dispersion A.

Ink 12 was prepared in the same manner as in the manufacturing of Ink 1 except that the aqueous dispersion 12 was used instead of the aqueous dispersion 1. Solid images were not properly printed or evaluated for inkjetting because many of the nozzles were clogged.

Comparative Example 5

Aqueous dispersion 13 containing pigment enclosing resin particles having at least two primary pigment particles was obtained in the same manner as in Example 1 except that the ratio (R/S) was changed to 1.0. Ink 13 was prepared in the same manner as in the manufacturing of Ink 1 except that the aqueous dispersion 13 was used instead of the aqueous dispersion 1. Solid images were not properly printed because many of the nozzles were clogged in the inkjet evaluation.

Comparative Example 6

A total of 60 g of pigment pre-dispersion A and 30 g of polyester α were added to a 0.3 litter separable flask equipped with a three one motor, an anchor wing, and a thermocouple in such a manner that the ratio (P/R) was 0.5 followed by mixing and stirring at 40 degrees C. to obtain a resin solution of pigment dispersion. Next, the solution was purged of methylethyl ketone under a reduced pressure in such a manner that the ratio (R/S) of polyester to methylethyl ketone (S: solvent) was 1.4. A total of 1.1 g of triethyl amine and 7.2 g of deionized water were then added to neutralize the acid value of the polyester followed by mixing and stirring for 0.5 hours. While stirring at 350 rpm, 57 g of deionized water was dripped at 15 ml/min followed by a 20 minute stirring to obtain an emulsion. The emulsion was purged of methylethyl ketone followed by filtering with a nylon net having an opening of 67 μm. Aqueous dispersion 14 was obtained by adjusting the solid content of the deionized water to 30 percent. Since what was obtained was coarse particles, they were not partially subjected to detailed evaluations. They were not discharged by inkjetting.

Comparative Example 7

Preparation of Master Batch (MB)
A total of 570 parts of the polyester γ and 430 parts of carbon black (SBX45, primary particle diameter of 22 m, DPB absorption of 55 ml/100 g, manufactured by ASAHI CARBON CO., LTD.) were preliminarily mixed with a Henshel mixer (manufactured by NIPPON COKE & ENGINEERING CO., LTD.). The mixture was melt-kneaded with a twin-shaft extruder followed by pulverization to obtain a master batch (M.B.).
Preparation of Aqueous Dispersion 15
A total of 13 g of M.B. (5.6 g of pigment and 7.4 g of polyester). 20.6 g of polyester α, and 20 g of methylethyl ketone were mixed and stirred at 40 degrees C. in a 0.3 litter separable flask equipped with a three one motor, an anchor wing, and a thermocouple to obtain a resin solution of pigment dispersion having a mass ratio (P/R) of 0.2. A total of 1.0 g of triethylamine equivalent to carboxyl group to neutralize the acid value of the polyester was added followed mixing and stirring for 0.5 hours. While stirring at 350 rpm, 65 g of deionized water was dripped at 15 ml/min followed by a 20 minute stirring to obtain an emulsion. The emulsion was purged of methylethyl ketone followed by filtering with a nylon net having an opening of 67 μm. The solid component of the resulting substance was adjusted with deionized water to 30 percent to obtain an aqueous dispersion 15 containing pigment enclosing resin particles having at least two primary pigment particles.
Preparation of Ink 14
Ink 14 was prepared in the same manner as in the manufacturing of Ink 1 except that the aqueous dispersion 15 was used instead of the aqueous dispersion 1.

Comparative Example 8

Aqueous dispersion 16 was obtained in the same manner as in Example 1 except that carbon black (SBX45, primary particle diameter of 22 m. DPB absorption of 55 ml/100 g, manufactured by ASAHI CARBON CO., LTD.) as untreated pigment was used instead of the pigment pre-dispersion A. Since what was obtained was coarse particles, the aqueous dispersion was not subjected to the particle diameter evaluation. They were not discharged by inkjetting.

Figure 3:
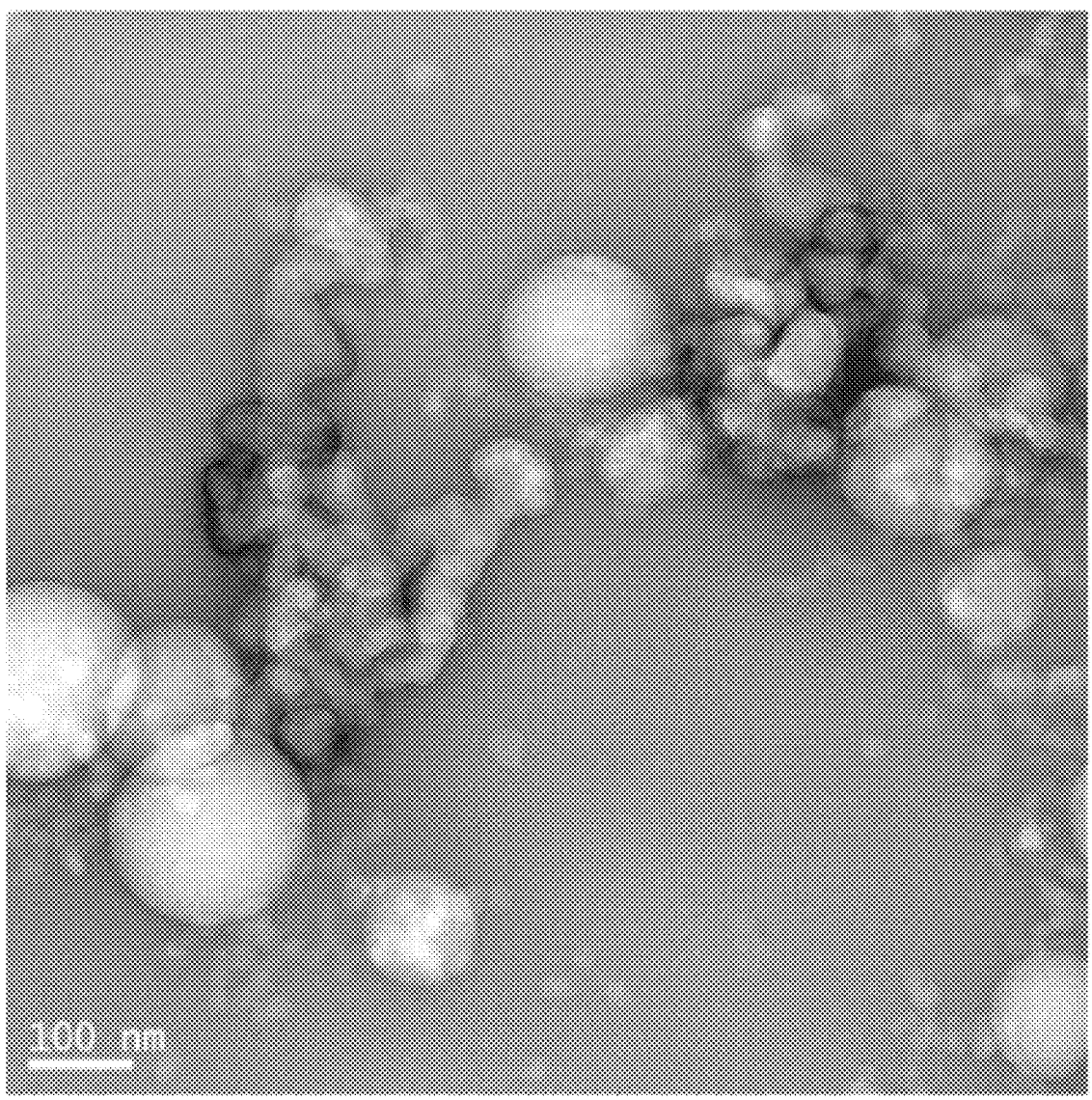
FIG. 3 is a TEM image illustrating the aqueous dispersion produced in Comparative Example 8, which is described later.

FIG. 3 is a TEM image of the obtained aqueous dispersion 16. The TEM image of FIG. 3 illustrates the state in which pigments are not enclosed in spherical resin emulsions.

Comparative Example 9

No emulsion was formed in the same manner as in Example 1 except that the amount of triethylamine that was used to neutralize the acid value of polyester was changed to 0.50 equivalent.

Comparative Example 10

Instead of a pigment enclosing resin particles, a polyester alone resin emulsion and aqueous dispersion 17 were prepared in the following manner to prepare ink 15.
Manufacturing of Polyester Alone Resin Emulsion
A total of 25 g of the polyester a and 14 g of methylethyl ketone were mixed and stirred at 40 degrees C. in a 0.3 litter separable flask equipped with a three one motor, an anchor wing, and a thermocouple to obtain a resin solution. A total of 0.84 g of triethylamine equivalent to carboxyl group was then added to neutralize the acid value of the polyester followed stirring for 20 minutes. While stirring at 350 rpm, 53 g of deionized water was dripped at 15 ml/min followed by a 20 minute stirring to obtain an emulsion. The emulsion was purged of methylethyl ketone followed by filtering with a nylon net having an opening of 67 μm. The solid content was adjusted to 30 percent with deionized water to obtain a polyester alone resin emulsion having a D50 of 78 nm.
Synthesis of Pigment Dispersant II
A total of 62.0 parts of 1,6-hexane diol (manufactured by Tokyo Chemical Industry Co. Ltd.) was dissolved in 700 ml of dichloromethane. Next, 20.7 parts of pyridine (manufactured by Tokyo Chemical Industry Co. Ltd.) was added to the solution followed by stirring. To the resulting solution, a solution in which 50.0 parts of 2-naphthalene carbonyl chloride (manufacture by Tokyo Chemical Industry Co. Ltd.) was dissolved in 100 ml of dichloromethane (manufactured by Tokyo Chemical Industry Co. Ltd.) was dripped in two hours followed by stirring at room temperature for six hours. The reaction solution was rinsed with water and thereafter the organic phase was isolated followed by drying with magnesium sulfate and the solvent was distilled away. The residue was purified by silica gel column chromatography with a solvent mixture of dichloromethane and methanol at a volume ratio of 98:2 as an eluent to obtain a compound.

Next, 42.1 parts of the obtained compound was dissolved in 80 ml of dried methylethylketone followed by heating at 60 degrees C. while being stirred. To the resulting solution, a solution in which 24.0 parts of KARENZ™ MOI (methylethyl ketone Showa Denko K.K.) was dissolved in 20 ml of dried methylethyl ketone was dripped in one hour followed by stirring at 70 degrees C. for 12 hours. After being cooled down to room temperature, the solvent was distilled away. The residue was purified by silica gel column chromatography with a solvent mixture of dichloromethane and methanol at a volume ratio of 99:1 as an eluent to obtain a monomer.

Next, 2.30 parts of acrylic acid (manufactured by Tokyo Chemical Industry Co. Ltd.), 8.54 g of the monomer, and 0.31 parts of 2,2'-azobis(isobutylnitrile) (manufactured by Tokyo Chemical Industry Co. Ltd.) were dissolved in 100 ml of methyl ethyl ketone. The obtained solution was stirred at 75 degrees C. for five hours in a nitrogen atmosphere. Thereafter, the reaction solution was cooled down to room temperature and precipitated five times using hexane to purify a copolymer. Thereafter, the purified copolymer was filtered followed by drying under a reduced pressure to obtain pigment dispersant II.

Preparation of Aqueous Dispersion

A total of 3.8 parts of pigment dispersant II was dissolved in 30.0 parts of diethanol amine aqueous solution in such a manner that pH was 8.0. Moreover, deionized water was added to make the total amount of the aqueous solution 45.0 parts. Next, the following recipe was mixed and placed in a glass screw tube bin (110 ml). Thereafter, 170 parts of zirconia balls having a diameter of 2.0 mm (YTZ ball, manufactured by NIKKATO CORPORATION) was added. The bin was fixed in a shaker (Vibrax VXR basic, manufactured by IKA Company) for stirring at 1,000 rpm for 24 hours. Thereafter, the dispersion was filtered with an acetic acid cellulose membrane filter having an average particle diameter of 5.0 μm. The media were separated from the liquid dispersion to prepare aqueous dispersion 17. D50 of this aqueous dispersion was 120 nm by ELSZ-1000.

Figure 4:
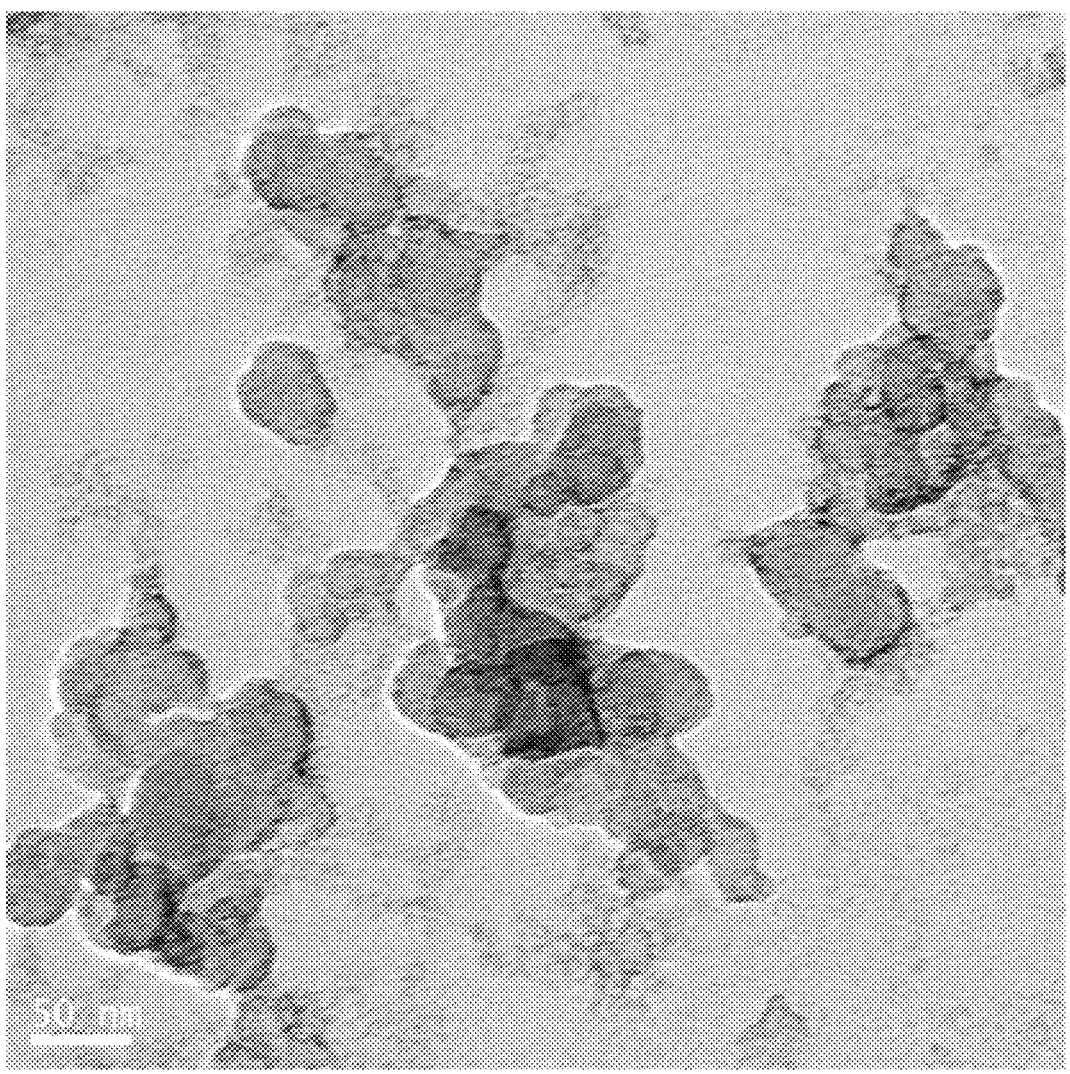
FIG. 4 is a TEM image illustrating the aqueous dispersion used in Comparative Example 10, which is described later.

- Carbon black (SBX45, manufactured by ASAHI CARBON CO., LTD.): 15.0 parts
- Aqueous solution of pigment dispersant II: 45.0 parts FIG. 4 is a TEM image of the obtained aqueous dispersion 17 used in Comparative Example 10.

Preparation of Ink 15

The ink of the following recipe was adjusted to have a viscosity of 7.5 mPa·s at 25 degrees C. using the polyester alone resin emulsion and the aqueous dispersion 17 followed by filtering with a membrane filter having an average pore diameter of 10 m to prepare Ink 15.

Figure 5:
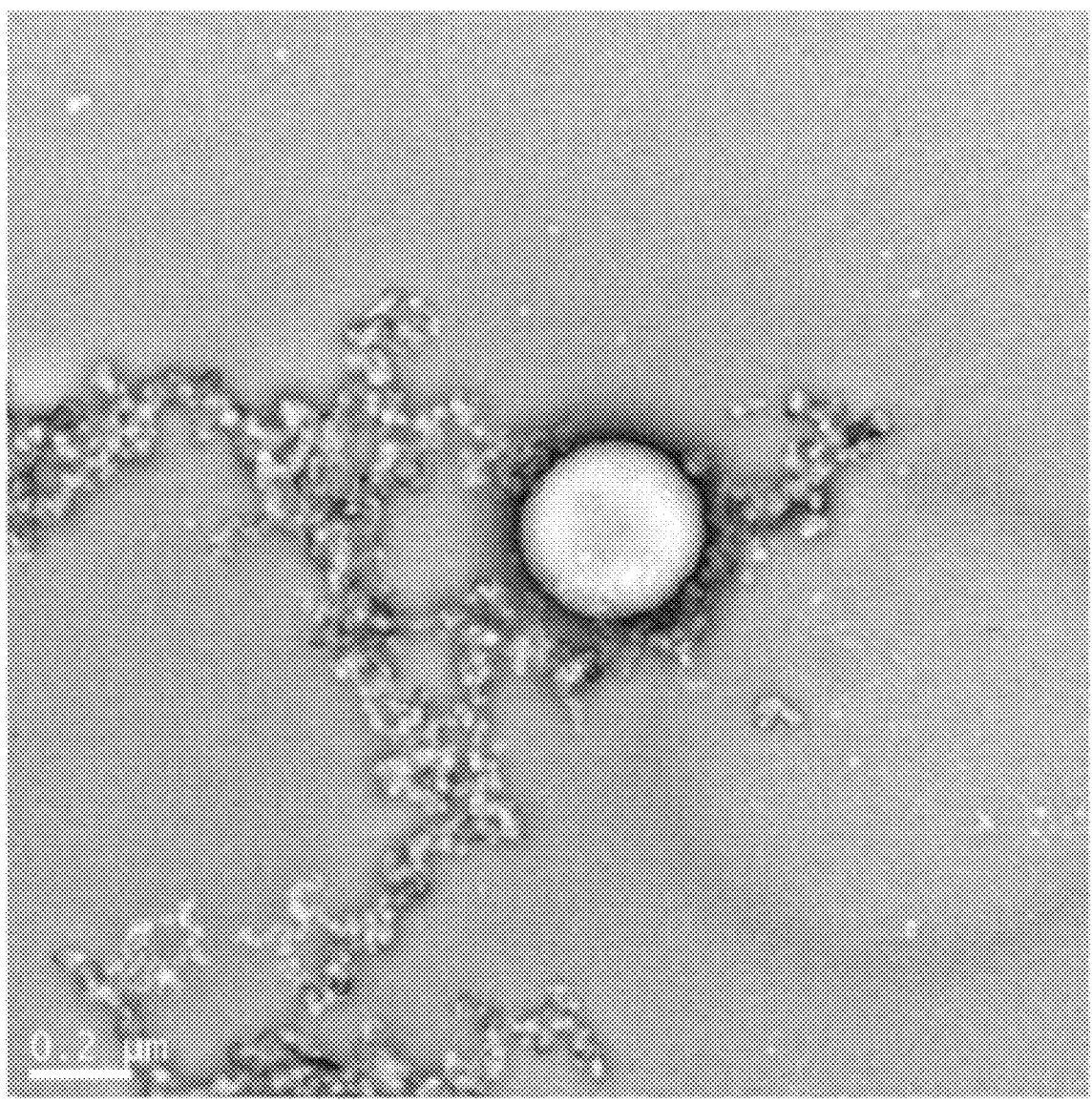
FIG. 5 is a TEM image illustrating the ink produced in Comparative Example 10, which is described later.
Figure 6:
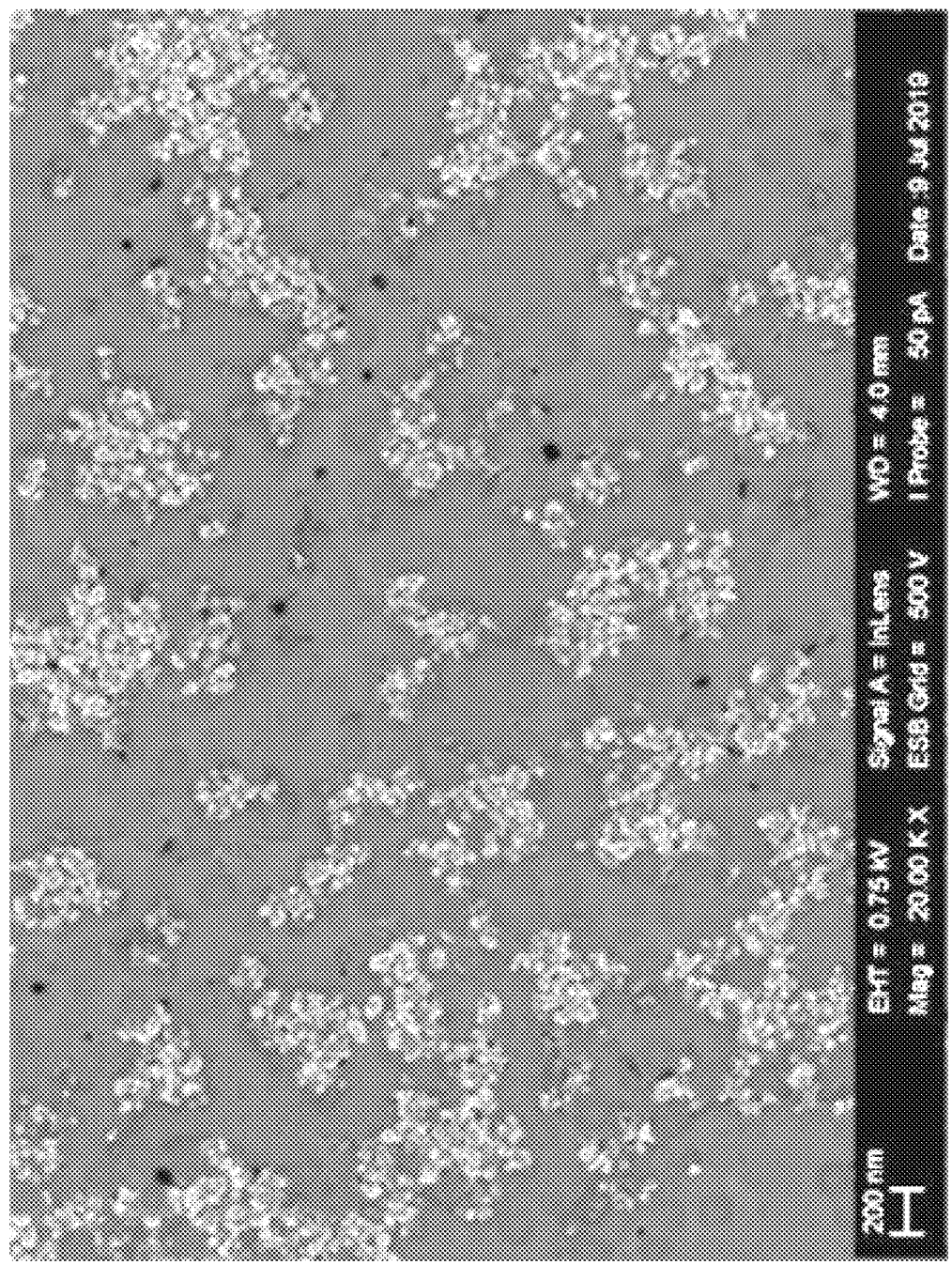
FIG. 6 is an SEM image illustrating the ink produced in Comparative Example 10, which is described later.

The TEM image and the SEM image of the ink obtained in Comparative Example 10 are illustrated in FIGS. 5 and 6. The TEM image of FIG. 5 illustrates the state in which pigments are not enclosed in spherical resin emulsions.

Ink Recipe

- Polyester alone resin emulsion (solid content): 5.375 percent
- Aqueous dispersion 17 (solid content): 5.375 percent
- Propylene glycol (prepared to have a viscosity of 7.5 mPa·s): about 40 percent
- Silicone-based surfactant: 1.0 percent (Silface SAG503A, manufactured by Nissin Chemical co., ltd.)
- Aliphatic dialcohol-based surfactant: 0.1 percent (Surfynol AD01, manufactured by Nissin Chemical co., ltd.)
- Water: Balance
- Total: 100 percent Evaluation The optical density was evaluated for each of the prepared inks in the following manner. The results are shown in Table 1.

Method of Outputting Image

The exterior of an inkjet printer (IPSiO Gxe 5500, manufactured by Ricoh Company Ltd.) was removed and multiple bypass feeders were attached on the rear side. Pure water (cleaning liquid) was caused to sufficiently flow in the ink supplying passage including the print head until the cleaning liquid was not colored. Thereafter, the cleaning liquid was completely removed from the device, which was used for evaluation.

An ink cartridge was filled with the prepared ink and used as the ink cartridge for evaluation. After conducting a filling operation and confirming that all the nozzles were filled with the ink for evaluation and no defective images were produced, "gloss and beautiful mode" was selected by a driver that was installed onto the printer. Thereafter, "color matching off" was determined as print mode at user settings. The amount of ink discharged in this mode was adjusted by changing the drive voltage of the head so that the amount of the ink present in the solid image on a recording medium was 20 g/m. The recording medium was LumiArt 130.

Optical Density

Two solid images were printed according to the method mentioned above. One of them was dried at room temperature of 25 degrees C. for one day and the other was dried by heating at 100 degrees C. in an oven for five minutes.

The whole density of the printed images placed on white plain paper was measured by a spectrophotometer (X-Rite 939). The value of K was defined as the optical density.

The difference (ΔOD) between the optical density of the image dried at 25 degrees C. and the optical density of the image dried at 100 degrees C. was calculated and graded according to the following evaluation criteria.

A: less than 0 percent
B: 0 percent
C: greater than 0 percent

TABLE 1

|  |  | Example | | | | | | | |
|---|---|---|---|---|---|---|---|---|---|
|  |  | 1 | 2 | 3 | 4 | 5 | 6 | 7 | 8 |
|  | Ink No. | 1 | 2 | 3 | 4 | 5 | 6 | 7 | 8 |
|  | Aqueous dispersion No. | 1 | 2 | 3 | 4 | 5 | 6 | 7 | 8 |
|  | Polyester | α | α | α | α | β | α | α | α |
|  | Pigment pre-dispersion | A | A | A | A | D | A | A | A |
| Proportion | Pigment/resin (P/R) | 0.5 | 0.5 | 0.2 | 0.35 | 0.55 | 0.5 | 0.5 | 0.6 |
|  | Resin/solvent (R/S) | 1.4 | 2 | 1.8 | 1.4 | 1.4 | 1.8 | 1.4 | 1.4 |
|  | Base equivalent (eq.) | 1 | 1 | 1 | 1 | 1 | 1 | 0.75 | 1 |
| Pigment | Volume-based D50 (nm) | 130 | 80 | 78 | 100 | 130 | 88 | 160 | 150 |
| enclosing | Aspect ratio | 1.1 | 1.1 | 1.2 | 1.2 | 1.2 | 1.1 | 1.3 | 1.3 |
| emulsion resin | Abundance ratio (percent) of pigment enclosing resin particles (TEM) | 89 | 70 | 23 | 48 | 60 | 73 | 79 | 65 |
| particles | Pigment exposure ratio (percent) (SEM) | 3 | 0 | 0 | 0 | 4 | 0 | 5 | 6 |
| Image | OD, Dried (25 degrees C.) | 1.9 | 1.9 | 1.8 | 1.8 | 2 | 1.6 | 1.8 | 1.9 |
| quality | OD, Dried (100 degrees C.) | 2.1 | 2.3 | 1.9 | 2.1 | 2.1 | 2.2 | 2 | 2 |
|  | Surface roughness (nm), Dried (100 degrees C.) | 7 | 4 | 3 | 4 | 8 | 4 | 9 | 10 |
|  | ΔOD | A | A | A | A | A | A | A | A |

TABLE 1-continued

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
|  | Ink No. | 9 | 10 | 11 | 12 | 13 | — | 14 | — | — | 15 |
|  | Aqueous dispersion No. | 9 | 10 | 11 | 12 | 13 | 14 | 15 | 16 | — | 17 |
|  | Polyester | γ | α | α | α | α | α | α | α | α | — |
|  | Pigment pre-dispersion | A | A | B | C | A | A | MB | Untreated | A | |
| Proportion | Pigment/resin (P/R) | 0.2 | 0.5 | 0.5 | 0.5 | 0.5 | 0.5 | 0.5 | 0.2 | 0.2 | 0.5 |
|  | Resin/solvent (R/S) | 1.4 | 1.4 | 1.4 | 1.4 | 1 | 1.4 | 1.4 | 1.4 | 1.4 | |
|  | Base equivalent (eq.) | 1 | 1 | 1 | 1 | 1 | 1 | 1 | 1 | 0.5 | |
| Pigment enclosing emulsion resin particles | Volume-based D50 (nm) | 90 | 1300 | 72 | 930 | 890 | 2500 | 350 | — | — | |
|  | Aspect ratio | 1.7 | 1.2 | — | 1.6 | 1.3 | 1.3 | 1.6 | — | — | |
|  | Abundance ratio (percent) of pigment enclosing resin particles (TEM) | 8 | 48 | 0 | 11 | 21 | 9 | 32 | 0 | — | 0 |
|  | Pigment exposure ratio (percent) (SEM) | 15 | 4 | 16 | 4 | 4 | 11 | 0 | 9 | — | 17 |
| Image quality | OD, Dried (25 degrees C.) | 1.4 | — | 1.9 | — | — | — | 1.7 | — | — | 2 |
|  | OD, Dried (100 degrees C.) | 1.2 | — | 1.8 | — | — | — | 1.7 | — | — | 1.5 |
|  | Surface roughness (nm), Dried (100 degrees C.) | 30 | — | 16 | — | — | — | 10 | — | — | 79 |
|  | ΔOD | C | — | C | — | — | — | B | — | — | C |

The present disclosure relates to the aqueous dispersion of the following 1 and also includes the following 2 to 8 as embodiments.

1. An aqueous dispersion contains emulsion resin particles that contains pigment enclosing emulsion resin particles each containing a resin and an inorganic pigment enclosed in the resin, wherein the pigment enclosing emulsion resin particles have a 50 percent cumulative volume particle diameter (D50) of from 40 to 30) nm as measured by laser diffraction scattering method, wherein the pigment enclosing emulsion resin particles have an average aspect ratio of from 1.0 to 1.5.

2. The aqueous dispersion according to 1 mentioned above, wherein the inorganic pigment contains carbon black.

3. The aqueous dispersion according to 1 or 2 mentioned above, wherein the mass ratio of the inorganic pigment to the resin in the aqueous dispersion is from 0.20 to 0.75, wherein the pigment exposure ratio is 8 percent or less by the following calculation:
the aqueous dispersion containing pigment enclosing emulsion resin particles is adjusted to have a solid content concentration of 10.75 percent by mass; the aqueous dispersion is applied to coated paper followed by drying at 25 degrees C. to obtain a coated film; the coated film is not subjected to electroconductivity treatment and observed by a scanning electron microscope equipped with back-scattered electron detector at an acceleration voltage of 0.75 kV and 20,000× magnification to obtain an image; the image is digitized to calculate a pigment area the ratio of the inorganic pigment at a surface of the coated film is determined as the pigment exposure ratio.

4. The aqueous dispersion according to any one of 1 to 3 mentioned above, wherein the ratio of the pigment enclosing emulsion resin particles in the emulsion resin particles having a particle diameter of 50 nm or greater is 30 percent by number or greater.

5. The aqueous dispersion according to any one of 1 to 4 mentioned above, wherein the emulsion resin particles contains polyester.

6. The aqueous dispersion according to 5 mentioned above, wherein the polyester has a carboxyl group and is a self-emulsifying resin.

7. A method of manufacturing the aqueous dispersion of any one of 1 to 6 mentioned above includes the following steps 1 to 4.

Step 1: pigment, pigment dispersant, and an organic solvent are mixed to obtain pigment pre-dispersion having a 50 percent cumulative volume particle diameter (D50) of pigments of from 10 to 150 nm.

Step 2: the pigment pre-dispersion obtained in the step 1 is mixed with resin to obtain a resin solution of pigment dispersion (pigment-dispersed resin solution).

Step 3: the pigment-dispersed resin solution obtained in the step 2 is mixed with water to obtain liquid dispersion pigment enclosing emulsion resin particles in which the pigment is enclosed in the resin.

Step 4: the liquid dispersion containing pigment enclosing emulsion resin particles obtained in the step 3 is purged of the organic solvent to obtain the aqueous dispersion containing the pigment enclosing emulsion resin particles.

8. An ink contains the aqueous dispersion of any one of 1 to 6 mentioned above.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An aqueous dispersion comprising:
   emulsion resin particles comprising:
      pigment enclosing emulsion resin particles each comprising:
         a resin; and
         an inorganic pigment enclosed in the resin,
      wherein the pigment enclosing emulsion resin particles have a 50 percent cumulative volume particle diameter (D50) of from 40 to 300 nm as measured by a laser diffraction scattering method,
      wherein the pigment enclosing emulsion resin particles have an average aspect ratio of from 1.0 to 1.5.

2. The aqueous dispersion according to claim 1, wherein the inorganic pigment comprises carbon black.

3. The aqueous dispersion according to claim 1,
wherein a mass ratio of the inorganic pigment to the resin in the aqueous dispersion is from 0.20 to 0.75, wherein a pigment exposure ratio is 8 percent or less by the following calculation:
the aqueous dispersion containing pigment enclosing emulsion resin particles is adjusted to have a solid content concentration of 10.75 percent by mass; the aqueous dispersion is applied to coated paper followed by drying at 25 degrees C. to obtain a coated film; without electroconductivity treatment, the coated film is observed by a scanning electron microscope equipped with back-scattered electron detector at an acceleration voltage of 0.75 kV and 20,000×magnification; an image of the coated film observed is digitized to calculate a pigment area thereof; and a ratio of the inorganic pigment at a surface of the coated film is determined as the pigment exposure ratio.

4. The aqueous dispersion according to claim 1, wherein the pigment enclosing emulsion resin particles account for 30 percent by number or greater of the emulsion resin particles having a particle diameter of 50 nm or greater.

5. The aqueous dispersion according to claim 1, wherein the emulsion resin particles comprise polyester.

6. The aqueous dispersion according to claim 5, wherein the polyester has a carboxyl group and is a self-emulsifying resin.

7. A method of manufacturing the aqueous dispersion of claim 1, comprising:
mixing a pigment, a pigment dispersant, and an organic solvent to obtain a pigment pre-dispersion having a 50 percent cumulative volume particle diameter (D50) of from 10 to 150 nm;
mixing the pigment pre-dispersion and a resin to obtain a pigment-dispersed resin solution;
mixing the pigment-dispersed resin solution with water to obtain a liquid dispersion containing pigment enclosing emulsion resin particles in which the pigment is enclosed in the resin; and
purging the liquid dispersion of the organic solvent to obtain the aqueous dispersion.

8. An ink comprising:
the aqueous dispersion of claim 1.

9. The aqueous dispersion according to claim 1, wherein the inorganic pigment is not dispersed in the resin.

* * * * *